(12) United States Patent
Kitade et al.

(10) Patent No.: US 10,035,921 B2
(45) Date of Patent: Jul. 31, 2018

(54) WATER-BASED INK FOR INKJET RECORDING

(71) Applicant: DIC CORPORATION, Tokyo (JP)

(72) Inventors: Maiko Kitade, Kita-adachi-gun (JP); Yukie Uemura, Takaishi (JP); Toshihisa Kimura, Kita-adachi-gun (JP); Hisakazu Tanaka, Takaishi (JP); Yasuo Oji, Takaishi (JP); Nobuhiro Oe, Takaishi (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/535,513

(22) PCT Filed: Dec. 3, 2015

(86) PCT No.: PCT/JP2015/083981
§ 371 (c)(1),
(2) Date: Jun. 13, 2017

(87) PCT Pub. No.: WO2016/098603
PCT Pub. Date: Jun. 23, 2016

(65) Prior Publication Data
US 2017/0342288 A1    Nov. 30, 2017

(30) Foreign Application Priority Data
Dec. 19, 2014 (JP) .................................. 2014-257346

(51) Int. Cl.
| | |
|---|---|
| *C09D 11/106* | (2014.01) |
| *C09D 11/322* | (2014.01) |
| *C09D 11/326* | (2014.01) |
| *C09D 11/38* | (2014.01) |
| *B41J 2/01* | (2006.01) |

(52) U.S. Cl.
CPC ................. *C09D 11/38* (2013.01); *B41J 2/01* (2013.01); *C09D 11/322* (2013.01)

(58) Field of Classification Search
USPC .......................................................... 523/160
See application file for complete search history.

(56) References Cited

U.S. PATENT DOCUMENTS

| | | | | |
|---|---|---|---|---|
| 8,133,313 B2* | 3/2012 | Akiyama | ............. | C09D 11/322 106/31.65 |
| 8,361,214 B2* | 1/2013 | Kiyomoto | ............. | C09D 11/38 106/31.86 |

FOREIGN PATENT DOCUMENTS

| | | |
|---|---|---|
| JP | 2014-205769 A | 10/2014 |
| JP | 2014-227440 A | 12/2014 |

OTHER PUBLICATIONS

International Search Report dated Mar. 8, 2016, issued in counterpart International Application No. PCT/JP2015/083981 (2 pages).

\* cited by examiner

*Primary Examiner* — Vu A Nguyen
(74) *Attorney, Agent, or Firm* — Westerman, Hattori, Daniels & Adrian, LLP

(57) ABSTRACT

A water-based ink for inkjet recording contains a pigment, water, organic solvents, at least one compound selected from urea compounds, and a binder resin. The organic solvents include at least (1) a water-soluble organic solvent having a boiling point of from 100° C. to 200° C. inclusive and a vapor pressure at 20° C. of 0.5 hPa or more, (2) propylene glycol, and (3) glycerin, diglycerin, and/or a derivative thereof serving as an organic solvent. Preferably, the water-based ink further contains a polymer (A) serving as a pigment dispersant. The polymer (A) has an anionic group and has a solubility in water of 0.1 g/100 mL or more, a number average molecular weight within the range of 1,000 to 6,000, and an acid value within the range of 40 to 190 mg KOH/g.

4 Claims, 1 Drawing Sheet

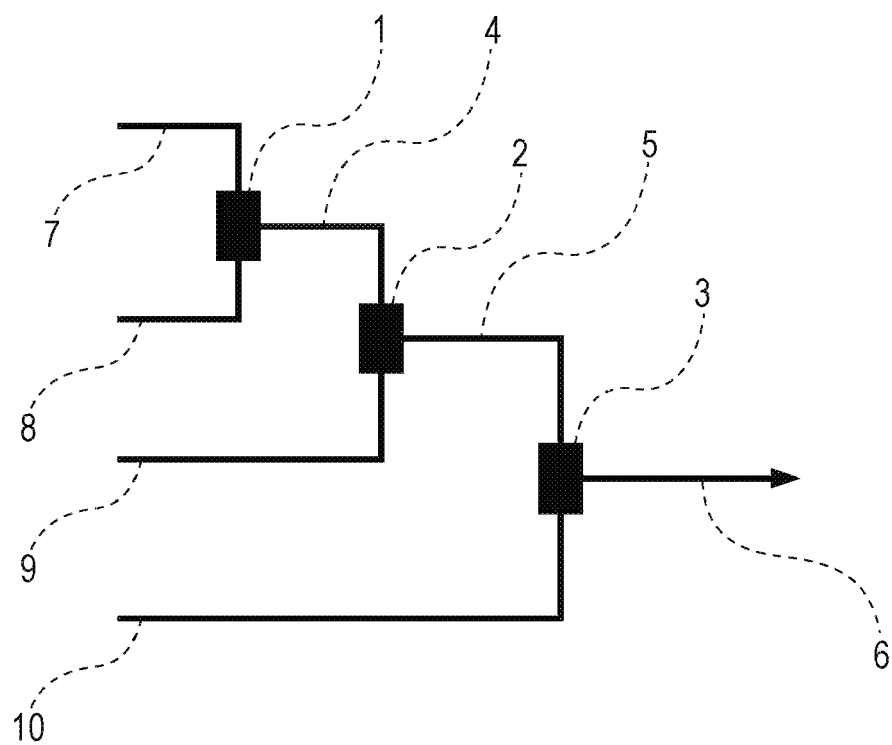

ical fields
WATER-BASED INK FOR INKJET RECORDING

TECHNICAL FIELD

The present invention relates to a water-based ink for inkjet recording.

BACKGROUND ART

Water-based inks for inkjet recording that use pigments as coloring materials are capable of on-demand printing and have many advantages such as good light fastness possessed by the pigments and a reduction in the risk of a fire and mutagenicity that could be caused by organic solvent inks. Therefore, such water-based inks are used not only for plain paper applications but also for wide variety of applications such as coated paper, art paper, plastic films such as vinyl chloride and polyester films, metals, and fabrics. In particular, the recent growth of the print-on-demand market has led to the need for printing on plain paper, coated paper, art paper, plastic films, etc. at a high speed comparable to the speed of planographic printing.

Generally, the drying rate of a water-based ink is lower than that of a solvent ink. In printing on plain paper with a water-based ink for plain paper, the water is absorbed by the paper. However, in printing with the water-based ink for plain paper on a non-water absorptive substrate such as plastic or metal, highly hydrophobic coated or art paper, etc., offset may occur in printed portions during high-speed printing, e.g., during stacking of sheets printed by sheet-fed printing or during winding in roll-to-roll printing. Another problem is that fixability is poor.

In the inkjet recording method, ink droplets are ejected from very fine nozzles of several tens of micrometers to record an image. When an ink with an excessively high drying rate is used, the ink may dry and adhere to the forward ends of the nozzles, and this may adversely affect the ejectability of the ink.

Accordingly, there is a need for water-based inks for inkjet recording excellent in ejectability and having a drying rate adaptive for high-speed printing even when the substrate is non-water absorptive plastic or metal, highly hydrophobic coated or art paper, etc.

One known water-based inkjet ink composition highly suitable for printing on coated paper, art paper, vinyl chloride sheets, etc. and capable of providing high-quality images is a water-based inkjet ink containing a water-soluble organic solvent having a boiling point of from 100° C. to 180° C. inclusive and an organic solvent having a boiling point of from 200° C. to 280° C. inclusive and a surface tension of from 20 mN/m to 30 mN/m inclusive (see, for example, PTL 1).

One known water-based inkjet ink suitable for high-speed printing uses a specific amount of a surfactant in which the average number of moles of ethylene oxide added to acetylene glycol is from 0.5 to 5.0 inclusive and a specific amount of another surfactant in which the average number of moles of ethylene oxide added to acetylene glycol is from 8.0 to 35.0 inclusive at a specific ratio (see, for example, PTL 2).

In PTL 1, drying properties are evaluated as follows. Printing is performed on a printer using different numbers of printing passes, and whether or not mottling occurs at the minimum number of passes is checked. However, even with an ink having high resistance to mottling (a trouble that occurs when the ink does not adhere to a solid printed portion (a portion fully covered with the ink) uniformly and forms a nonuniform printed surface), the above offset problem that occurs during high-speed printing has not yet been solved in all cases. In PTL 2, offset in printed portions is not studied. Moreover, in the above literature, ejection failure caused by drying of the ink is not studied.

CITATION LIST

Patent Literature

PTL 1: Japanese Unexamined Patent Application Publication No. 2014-205769
PTL 2: Japanese Unexamined Patent Application Publication No. 2014-227440

SUMMARY OF INVENTION

Technical Problem

An object of the present invention is to provide a water-based ink for inkjet recording that is excellent in ejectability, is capable of providing an image surface with excellent rubfastness even when the substrate is a non-water absorptive substrate such as a plastic or metal substrate, highly hydrophobic coated or art paper, etc., and causes no offset even when printed sheets are stacked immediately after printing.

Solution to Problem

The present inventors have achieved the above object by using a urea compound as an essential ingredient and specific organic solvents in combination.

Accordingly, the present invention provides a water-based ink for inkjet recording comprising a pigment, water, a binder resin, organic solvents, and at least one compound selected from urea compounds,
wherein the organic solvents include at least:
(1) a water-soluble organic solvent having a boiling point of from 100° C. to 200° C. inclusive and a vapor pressure at 20° C. of 0.5 hPa or more;
(2) propylene glycol; and
(3) glycerin, diglycerin, and/or a derivative thereof.

Advantageous Effects of Invention

According to the present invention, a water-based ink for inkjet recording can be obtained, which is excellent in ejectability, is capable of providing an image surface with excellent rubfastness even when the substrate is a non-water absorptive substrate such as a plastic or metal substrate, highly hydrophobic coated or art paper, etc., and causes no offset even when printed sheets are stacked immediately after printing.

DESCRIPTION OF EMBODIMENTS (Organic Solvents)
The present invention is characterized by using organic solvents including:
(1) a water-soluble organic solvent having a boiling point of from 100° C. to 200° C. inclusive and a vapor pressure at 20° C. of 0.5 hPa or more (hereinafter referred to as an organic solvent (S1));
(2) propylene glycol; and (3) glycerin, diglycerin, and/or a derivative thereof serving as an organic solvent (hereinafter referred to as an organic solvent (S3)).

The use of these organic solvents provides the following effects. Drying and solidification of the ink around nozzles can be prevented while the drying properties of the ink during printing are ensured. Even when the ink dries around the nozzles and forms a film, the film can be easily redispersed. This allows the ejectability of the ink to be ensured, and good drying properties on the substrate are obtained.

(Organic Solvent (S1))

Examples of the organic solvent (S1), i.e., the water-soluble organic solvent having a boiling point of from 100° C. to 200° C. inclusive and a vapor pressure at 20° C. of 0.5 hPa or more, include 3-methoxy-1-butanol, 3-methyl-3-methoxy-1-butanol, 3-methoxy-3-methyl-1-butyl acetate, ethylene glycol monomethyl ether, ethylene glycol monoethyl ether, ethylene glycol monopropyl ether, ethylene glycol monobutyl ether, ethylene glycol monoisobutyl ether, ethylene glycol-t-butyl ether, propylene glycol monomethyl ether, propylene glycol monoethyl ether, propylene glycol monopropyl ether, propylene glycol monomethyl ether acetate, diethylene glycol dimethyl ether, diethylene glycol methylethyl ether, diethylene glycol diethyl ether, dipropylene glycol dimethyl ether, 4-methoxy-4-methyl-2-pentanone, and ethyl lactate. Two or more of these solvents may be used simultaneously.

Of these, a water-soluble organic solvent having a hydrogen-bond term in Hansen solubility parameters (HSP) within the range of 6 to 20 is preferred in terms of the stability of the ink, durability of an inkjet device, etc.

Specifically, the water-soluble organic solvent is preferably 3-methoxy-1-butanol, 3-methyl-3-methoxy-1-butanol, ethylene glycol monomethyl ether, ethylene glycol monoethyl ether, ethylene glycol monopropyl ether, ethylene glycol monobutyl ether, ethylene glycol monoisobutyl ether, ethylene glycol-t-butyl ether, propylene glycol monomethyl ether, or propylene glycol monoethyl ether, and more preferably 3-methoxy-1-butanol or 3-methyl-3-methoxy-1-butanol.

In the water-based ink for inkjet recording of the present invention, the content of the organic solvent (S1) is preferably 1 to 20% by mass based on the total mass of the ink. The content of the organic solvent (S1) is independently more preferably 1 to 15% by weight based on the total weight of the ink and still more preferably 2 to 10% by weight based on the total weight of the ink.

In the water-based ink for inkjet recording of the present invention, the content of (2) propylene glycol is preferably 1 to 20% by mass based on the total mass of the ink. The content of (2) propylene glycol is independently more preferably 1 to 15% by weight based on the total weight of the ink and still more preferably 2 to 10% by weight based on the total weight of the ink.

(Organic Solvent (S3))

Examples of the organic solvent (S3), i.e., glycerin, diglycerin, and/or a derivative thereof serving as an organic solvent, include glycerin, diglycerin, polyglycerin, diglycerin fatty acid esters, polyoxypropylene(n)polyglyceryl ether represented by general formula (S3-1), and polyoxyethylene(n)polyglyceryl ether represented by general formula (S3-2). Two or more of these organic solvents may be used simultaneously. In the present invention, it is particularly preferable to select glycerin and polyoxypropylene(n) polyglyceryl ether with n=8 to 15.

[Chem. 1]

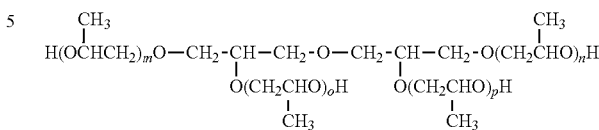

(S3-1)

[Chem. 2]

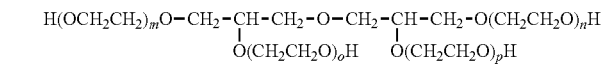

(S3-2)

In general formulas (S3-1) and (S3-2), m, n, o, and p are each independently an integer of 1 to 10.

In the water-based ink for inkjet recording of the present invention, the content of the organic solvent (S3) is preferably 1 to 20% by mass based on the total mass of the ink. The content of the organic solvent (S3) is independently more preferably 1 to 15% by weight based on the total weight of the ink and still more preferably 2 to 10% by weight based on the total weight of the ink.

(Urea Compound)

The urea compound used in the present invention is urea or a derivative of urea. Urea and urea derivatives have a high moisture retaining function, serve as a solid humectant capable of preventing drying and solidification around the nozzles, and therefore have the function of ensuring ink ejectability. Urea and urea derivatives exhibit a high water-releasing function upon heating, provide good drying properties on a substrate, and can therefore be used preferably for the water-based ink for inkjet recording of the present invention.

Examples of the urea derivatives include ethyleneurea, propyleneurea, diethylurea, thiourea, N,N-dimethylurea, hydroxyethylurea, hydroxybutylurea, ethylenethiourea, and diethylthiourea, and two or more of these urea derivatives may be used simultaneously. In the present invention, it is particularly preferable to select urea, ethyleneurea, or 2-hydroxyethylurea.

In terms of improving the ink ejectability, the drying properties on the substrate, etc., the content of the urea compound in the water-based ink for inkjet recording of the present invention is preferably from 1 to less than 20% by mass, more preferably from 2 to less than 15% by mass, and still more preferably from 3 to less than 10% by mass based on the total mass of the ink.

The amount of the organic solvent (S1), the propylene glycol, the organic solvent (S3), and the urea compound added to the ink, i.e., the total amount of the organic solvent (S1), the propylene glycol, the organic solvent (S3), and the urea compound, is preferably 20 to 50% by mass based on the total mass of the ink. If the amount added is excessively small, drying properties and wettability to a print medium are poor, and the quality of printing may deteriorate for some print mediums. If the amount added is more than 50% by mass, the ink ejectability may be adversely affected. The amount added is more preferably 20 to 40% by mass and still more preferably 22 to 35% by mass.

(Pigment)

No particular limitation is imposed on the pigment used in the present invention, and an organic pigment or an inorganic pigment commonly used for water-based gravure inks and water-based inks for inkjet recording may be used. The pigment used may be an untreated pigment or may be a treated pigment. When plastic is used as a printing substrate, a white ink is used in addition to a yellow ink, a cyan ink, a magenta ink, and a black ink for the purpose of improving visibility.

Specifically, a known inorganic or organic pigment that can be dispersed in water and a water-soluble organic solvent can be used. Examples of the inorganic pigment include iron oxide and carbon black produced by known methods such as a contact method, a furnace method, and a thermal method. Examples of the organic pigment that can be used include azo pigments (including azo lakes, insoluble azo pigments, condensed azo pigments, chelate azo pigments, etc.), polycyclic pigments (such as phthalocyanine pigments, perylene pigments, perinone pigments, anthraquinone pigments, quinacridone pigments, dioxazine pigments, thioindigo pigments, isoindolinone pigments, and quinophthalone pigments), dye chelates (such as basic dye-type chelates and acid dye-type chelates), nitro pigments, nitroso pigments, and aniline black.

Examples of the pigment used for black inks include: carbon black manufactured by Mitsubishi Chemical Corporation such as No. 2300, No. 2200B, No. 900, No. 960, No. 980, No. 33, No. 40, No, 45, No. 45L, No. 52, HCF88, MA7, MA8, and MA100; carbon black manufactured by Columbian chemicals Company such as Raven 5750, Raven 5250, Raven 5000, Raven 3500, Raven 1255, and Raven 700; carbon black manufactured by Cabot Corporation such as Regal 400R, Regal 330R, Regal 660R, Mogul L, Mogul 700, Monarch 800, Monarch 880, Monarch 900, Monarch 1000, Monarch 1100, Monarch 1300, and Monarch 1400; and carbon black manufactured by Degussa such as Color Black FW1, FW2, FW2V, FW18, FW200, S150, S160, and S170, Printex 35, U, V, and 1400U, Special Black 6, 5, 4, and 4A, NIPEX 150, NIPEX 160, NIPEX 170, and NIPEX 180.

Specific examples of the pigment used for yellow inks include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Specific examples of the pigment used for magenta inks include C.I. Pigment Red 5, 7, 12, 48(Ca), 48(Mn), 57(Ca), 57:1, 112, 122, 123, 146, 168, 176, 184, 185, 202, 209, 269, and 282 and C.I. Pigment Violet 19.

Specific examples of the pigment used for cyan inks include C.I. Pigment Blue 1, 2, 3, 15, 15:3, 15:4, 16, 22, 60, 63, and 66.

Specific examples of the pigment used for white inks include: sulfates and carbonates of alkaline-earth metals; silicas such as fine silicic acid powder and synthetic silicates; calcium silicate; alumina; hydrated alumina; titanium oxide; zinc oxide; talc; and clay. These inorganic white pigments may have been subjected to surface treatment using various surface treatment methods.

Preferably, measures for allowing the pigment to be well dispersed in a water-soluble solvent and/or water used as a medium have been taken in order to stabilize the pigment present in a water-based pigment composition.

Specifically, it is preferable to use a method in which the pigment is dispersed in a water-soluble solvent and/or water together with a general-purpose pigment dispersant such as a polymer dispersant, a surfactant, or a pigment derivative using a dispersing method described later to thereby prepare a water-based pigment composition. Alternatively, dispersibility-imparting groups (hydrophilic functional groups and/or a salt thereof) are bonded to the surface of the pigment directly or indirectly through alkyl groups, alkyl ether groups, aryl groups, etc. to thereby prepare a self-dispersible pigment that can disperse and/or dissolve in a water-soluble solvent and/or water without a general-purpose pigment dispersant. The self-dispersible pigment is dispersed in a water-soluble solvent and/or water to prepare a pigment dispersion, and the pigment dispersion is mixed in a water-based pigment ink.

(Pigment Dispersant)

No particular limitation is imposed on the pigment dispersant used in the present invention, and a known polymer dispersant, a known surfactant, or a known pigment derivative may be used.

The pigment dispersant is preferably an aqueous resin, and preferred examples thereof include: polyvinyl alcohols; polyvinylpyrrolidones; acrylic resins such as acrylic acid-acrylate copolymers; styrene-acrylic resins such as styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers; styrene-maleic acid copolymers; styrene-maleic anhydride copolymers, vinylnaphthalene-acrylic acid copolymers, and salts of these aqueous resins. A commercial product can, of course, be used. Examples of the commercial product that can be used include AJISPER PB series manufactured by Ajinomoto Fine-Techno Co., Inc.), Disperbyk series manufactured by BYK-Chemie Japan, EFKA series manufactured by BASF, SOLSPERSE series manufactured by The Lubrizol Corporation, and TEGO series manufactured by EVONIK.

In the present invention, to obtain an ink for inkjet recording having further improved ejectability, a polymer (A) may be used as the pigment dispersant. In this case, an ink with the number of coarse particles significantly reduced can be obtained.

(Polymer (A))

The polymer (A) used in the present invention is a polymer having a solubility in water of 0.1 g/100 mL or less and a number average molecular weight within the range of 1,000 to 6,000. Preferably, the polymer (A) forms fine particles in water when the degree of neutralization of the anionic groups with a basic compound is 100%.

(Solubility in Water)

In the present invention, the solubility of the polymer (A) in water is defined as follows. Sieves with mesh sizes of 250 µm and 90 µm are used to screen the polymer such that its particle diameter falls within the range of 250 µm to 90 µm. 0.5 g of the resulting polymer is sealed in a bag formed from a 400-mesh wire net, immersed in 50 mL of water, and left under mild stirring at a temperature of 25° C. for 24 hours. After immersion for 24 hours, the 400-mesh wire net with the polymer sealed therein is dried in a dryer set at 110° C. for 2 hours. The change in weight of the 400-mesh wire net with the polymer sealed therein before and after the immersion in water is measured, and the solubility is computed using the following formula.

Solubility (g/100 mL)=(polymer-sealed 400-mesh wire net before immersion (g)−polymer-sealed 400-mesh wire net after immersion (g))×2   [Formula 1]

(Fine Particles)

In the present invention, whether or not fine particles are formed in water when the degree of neutralization of the anionic groups with the basic compound is 100% is judged as follows.

(1) The acid value of the polymer is measured in advance by an acid value measurement method according to JIS test method K 0070-1992. Specifically, 0.5 g of the polymer is dissolved in a tetrahydrofuran (hereinafter may be referred to as THF) solvent, and titration with a 0.1M alcohol solution of potassium hydroxide is performed using phenolphthalein as an indicator to determine the acid value.

(2) 1 g of the polymer is added to 50 mL of water, and a 0.1 mol/L aqueous potassium hydroxide solution is added in an amount sufficient to completely neutralize the polymer having the above-determined acid value to thereby completely neutralize the polymer.

(3) The completely neutralized solution is subjected to ultrasonic waves at a temperature of 25° C. for 2 hours using an ultrasonic cleaner (ultrasonic cleaner US-102, SND Co., Ltd., 38 kHz, self-excited oscillation) and is then left to stand at room temperature for 24 hours.

After the solution is left to stand for 24 hours, a sample solution is sampled at a depth of 2 cm from the surface of the solution. Then a dynamic light scattering particle size distribution measurement device (dynamic light scattering particle size measurement device "Microtrac particle size distribution analyzer UPA-ST150" manufactured by NIKKISO Co., Ltd.) is used to determine whether or not information about light scattering due to the formation of fine particles is obtained, whereby the presence of fine particles is checked.

(Diameter of Fine Particles)

If the diameter of the fine particles obtained from the polymer (A) used in the present invention is excessively large, the polymer (A) may not be stable in water. Therefore, it is preferable that the particle diameter of the polymer (A) is not excessively large. The particle diameter is preferably within the range of 5 to 1,000 nm, more preferably within the range of 7 to 700 nm, and most preferably within the range of 10 to 500 nm. As the particle size distribution of the fine particles becomes narrower, the fine particles tend to exhibit better dispersibility. However, an embodiment in which the fine particles have a wide particle size distribution is not excluded.

The particle diameter and the particle size distribution are measured by the same method as the above-described measurement method for the fine particles using the dynamic light scattering particle size distribution measurement device (dynamic light scattering particle size measurement device "Microtrac particle size distribution analyzer UPA-ST150" manufactured by NIKKISO Co., Ltd.).

(Degree of Neutralization of Polymer (A))

The degree of neutralization of the polymer (A) used in the present invention is determined using the following formula.

Degree of neutralization (%)=((mass (g) of basic compound)×56×1,000)/(acid value (mg KOH/g) of polymer (*A*)×number of equivalents of basic compound×mass (g) of polymer (*A*))×100   [Formula 2]

The acid value of the polymer (A) is measured according to JIS test method K 0070-1992. Specifically, 0.5 g of a sample is dissolved in a THF solvent, and the resulting solution is titrated with a 0.1M alcoholic solution of potassium hydroxide using phenolphthalein as an indicator to determine the acid value.

(Number Average Molecular Weight of Polymer (A))

The number average molecular weight of the polymer (A) used in the present invention is 1,000 to 6,000. As described above, the resin in the present invention has a low solubility in water, i.e., 0.1 g/100 mL or less. Therefore, when the polymer (A) has an excessively large molecular weight, a precipitate may be formed when the polymer (A) is dispersed in water even though the polymer (A) has been neutralized with the basic compound. Moreover, the penetrability of the polymer (A) into pigment aggregates becomes low, and its ability to disintegrate the pigment aggregates tends to become low, so that the pigment cannot be dispersed easily.

If the number average molecular weight is less than 1,000, the stability of an aqueous pigment dispersion to be obtained may deteriorate.

From this point of view, it is preferable that the polymer (A) used in the present application has a low molecular weight. In particular, the number average molecular weight of the polymer (A) is more preferably 1,300 to 5,000 and most preferably 1,500 to 4,500.

In the present invention, the number average molecular weight is a polystyrene-equivalent value measured by GPC (gel permeation chromatography) and is specifically a value measured under the conditions described below.

(Method for Measuring Number Average Molecular Weight (Mn))

The measurement is performed by gel permeation chromatography (GPC) under the following conditions.

Measurement device: High performance GPC ("HLC-8220GPC" manufactured by TOSOH Corporation)

Columns: The following columns manufactured by TOSOH Corporation and connected in series are used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (refractive index detector)

Column temperature: 40° C.

Eluent: Tetrahydrofuran (THF)

Flow rate: 1.0 mL/minute

Injection amount: 100 μL (THF solution with a sample concentration of 0.4% by mass)

Standard samples: The following polystyrene standards are used to produce a calibration curve.

(Polystyrene Standards)

"TSKgel standard polystyrene A-500" manufactured by TOSOH Corporation

"TSKgel standard polystyrene A-1000" manufactured by TOSOH Corporation

"TSKgel standard polystyrene A-2500" manufactured by TOSOH Corporation

"TSKgel standard polystyrene A-5000" manufactured by TOSOH Corporation

"TSKgel standard polystyrene F-1" manufactured by TOSOH Corporation

"TSKgel standard polystyrene F-2" manufactured by TOSOH Corporation

"TSKgel standard polystyrene F-4" manufactured by TOSOH Corporation

"TSKgel standard polystyrene F-10" manufactured by TOSOH Corporation

"TSKgel standard polystyrene F-20" manufactured by TOSOH Corporation

"TSKgel standard polystyrene F-40" manufactured by TOSOH Corporation

"TSKgel standard polystyrene F-80" manufactured by TOSOH Corporation

"TSKgel standard polystyrene F-128" manufactured by TOSOH Corporation

"TSKgel standard polystyrene F-288" manufactured by TOSOH Corporation

"TSKgel standard polystyrene F-550" manufactured by TOSOH Corporation (Surface Tension)

An aqueous resin dispersion containing the polymer (A) used in the present invention can have a surface tension of about 70 dyn/cm, which is close to the surface tension of water. It is expected that the higher the surface tension of the pigment dispersant, the more easily the surface tension of the pigment dispersion obtained can be maintained at a certain level or higher. When the polymer used is a water-soluble polymer that has a high solubility in water and does not form fine particles even when the degree of neutralization of the anionic groups with the basic compound is 100%, the surface tension of the aqueous solution of the polymer tends to be very low. In the present invention, it is preferable that the surface tension of the aqueous resin dispersion obtained using the polymer (A) is 30 dyn/cm or more, and it is more preferable that the surface tension of the polymer (A) is 40 dyn/cm or more. The surface tension is a value measured on a completely neutralized resin solution prepared by adding 1 g of the polymer (A) and then adding a 0.1 mol/L aqueous potassium hydroxide solution in an amount sufficient to completely neutralize the polymer with the acid value determined.

No particular limitation is imposed on the polymer (A), so long as it is a polymer which, as described above, is insoluble or poorly soluble in water used as a main solvent of the pigment dispersion when not neutralized, forms fine particles when completely neutralized, and contains, in addition to the hydrophilic anionic groups, hydrophobic groups in its molecule.

Examples of such a polymer include a block polymer including a polymer block having hydrophobic groups and a polymer block having anionic groups. However, although the polymer is a block polymer, if the polymer has a solubility in water of more than 0.1 g/100 mL or does not form fine particles when the degree of neutralization of the anionic groups with the basic compound is 100%, the effects of the present invention are not obtained.

The number of hydrophobic groups and the number of anionic groups are as follows. If the number of anionic groups is excessively large, it is highly probable that the solubility in water exceeds 0.1 g/100 mL or fine particles are not formed when the degree of neutralization of the anionic groups with the basic compound is 100%. From this point of view, it is preferable that the number of anionic groups is not so large. In a polymer, the number of anionic groups and the solubility in water are not necessarily determined by the acid value of the polymer and the number of anionic groups in the design phase of the polymer. For example, among polymers having the same acid value, a polymer having a low molecular weight tends to have a high solubility in water, and a polymer having a high molecular weight tends to have a low solubility in water. Therefore, in the present invention, the polymer (A) is specified by its solubility in water.

The polymer (A) may be a homopolymer but is preferably a copolymer. The polymer (A) may be a random polymer, a block polymer, or an alternating polymer and is preferably a block polymer. The polymer may be a branched polymer but is preferably a linear polymer.

It is preferable in terms of design flexibility that the polymer (A) is a vinyl polymer. To produce a vinyl polymer having the molecular weight and solubility characteristics desired in the present invention, it is preferable to use a production method using "living polymerization" such as living radical polymerization, living cationic polymerization, or living anionic polymerization.

In particular, it is preferable that the polymer (A) is a vinyl polymer produced using a (meth)acrylate monomer as one of the raw materials. The method for producing such a vinyl polymer is preferably living radical polymerization or living anionic polymerization. Living anionic polymerization is preferred from the viewpoint that the molecular weight of the block polymer and each segment thereof can be more precisely designed.

(Polymer (A) Produced by Living Anionic Polymerization)

Specifically, the polymer (A) produced by living anionic polymerization is a polymer represented by general formula (1).

[Chem. 3]

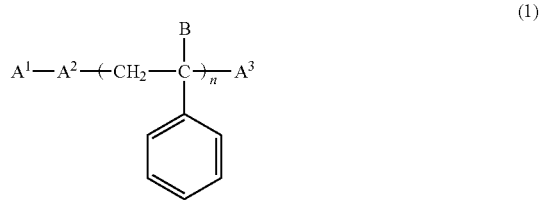

(1)

In formula (1), $A^1$ represents an organic lithium initiator residue, $A^2$ represents a polymer block of a monomer having an aromatic ring or a heterocycle, $A^3$ is a polymer block containing an anionic group, n represents an integer of 1 to 5, and B represents an aromatic group or an alkyl group.

In general formula (1), $A^1$ represents an organic lithium initiator residue. Specific examples of the organic lithium initiator include: alkyl lithiums such as methyllithium, ethyllithium, propyllithium, butyllithium (e.g., n-butyllithium, sec-butyllithium, iso-butyllithium, and tert-butyllithium), pentyllithium, hexyllithium, methoxymethyllithium, and ethoxymethyllithium; phenylalkylenelithiums such as benzyllithium, α-methylstyryllithium, 1,1-diphenyl-3-methylpentyllithium, 1,1-diphenylhexyllithium, and phenylethyllithium; alkenyllithiums such as vinyllithium, allyllithium, propenyllithium, and butenyllithium; alkynyllithiums such as ethynyllithium, butynyllithium, pentynyllithium, and hexynyllithium; aryllithiums such as phenyllithium and naphthyllithium; heterocyclic lithiums such as 2-thienyllithium, 4-pyridyllithium, and 2-quinolyllithium; and alkyl lithium-magnesium complexes such as tri(n-butyl)magnesium lithium and trimethyl magnesium lithium.

With the organic lithium initiator, the bond between the organic group and lithium is cleaved. An active end is thereby formed in the organic group, and polymerization starts from the active end. Therefore, the organic group originating from the organic lithium is bonded to an end of the polymer obtained. In the present invention, the organic group originating from the organic lithium and bonded to the end of the polymer is referred to as the organic lithium initiator residue. For example, in a polymer using methyllithium as the initiator, the organic lithium initiator acid group is a methyl group. In a polymer using butyllithium as the initiator, the organic lithium initiator acid group is a butyl group.

In general formula (1) above, $A^2$ represents a polymer block having hydrophobic groups. $A^2$ is a group used for the purpose of obtaining the appropriate solubility balance as described above and is preferably a group that exhibits high adsorptive power for the pigment when in contact with the pigment. From this point of view, $A^2$ is preferably a polymer block of a monomer having an aromatic ring or a heterocycle.

Specifically, the polymer block of a monomer having an aromatic ring or a heterocycle is a homopolymer or copolymer block obtained by homopolymerization or copolymerization of a monomer having an aromatic ring such as a styrene-based monomer or a monomer having a heterocycle such as a vinylpyridine-based monomer.

Examples of the monomer having an aromatic ring include: styrene-based monomers such as styrene, p-tert-butyldimethylsiloxystyrene, o-methylstyrene, p-methylstyrene, p-tert-butylstyrene, p-tert-butoxystyrene, m-tert-butoxystyrene, p-tert-(1-ethoxymethyl)styrene, m-chlorostyrene, p-chlorostyrene, p-fluorostyrene, α-methylstyrene, and p-methyl-α-methylstyrene; vinylnaphthalene; and vinylanthracene.

Examples of the monomer having a heterocycle include vinylpyridine-based monomers such as 2-vinylpyridine and 4-vinylpyridine.

These monomers may be used alone or in combination or two or more types.

In general formula (1) above, $A^3$ represents a polymer block containing an anionic group. $A^3$ is used for the purpose of providing appropriate solubility as described above and for the purpose of imparting dispersion stability in water when a pigment dispersion is formed.

Examples of the anionic group in the polymer block $A^3$ include a carboxyl group, a sulfonic acid group, and a phosphoric acid group. Of these, a carboxyl group is preferred because of the ease of preparation, a wide choice of monomer types, and availability. Two carboxyl groups in the same molecule or different molecules may undergo dehydration condensation to thereby form an acid anhydride group.

No particular limitation is imposed on the method for introducing anionic groups into $A^3$. For example, when the anionic groups are carboxyl groups, $A^3$ may be a homopolymer or copolymer block (PB1) obtained by homopolymerization of (meth)acrylic acid or copolymerization of (meth)acrylic acid with another monomer or may be a polymer block (PB2) obtained by homopolymerizing a (meth)acrylate having a protecting group that can be reconverted into an anionic group by deprotection or copolymerizing this (meth)acrylate with another monomer to obtain a homopolymer or a copolymer and then reconverting part or all of the protecting groups that can be reconverted into anionic groups into the anionic groups.

The (meth)acrylic acid used for the polymer block $A^3$ is a generic term for acrylic acid and methacrylic acid, and the (meth)acrylate is a generic term for acrylate and methacrylate.

Specific examples of the (meth)acrylic acid and (meth)acrylate include (meth)acrylic acid, methyl (meth)acrylate, ethyl (meth)acrylate, iso-propyl (meth)acrylate, allyl (meth)acrylate, n-butyl (meth)acrylate, iso-butyl (meth)acrylate, sec-butyl (meth)acrylate, tert-butyl (meth)acrylate, n-amyl (meth)acrylate, iso-amyl (meth)acrylate, n-hexyl (meth)acrylate, n-octyl (meth)acrylate, 2-ethylhexyl (meth)acrylate, n-lauryl (meth)acrylate, n-tridecyl (meth)acrylate, n-stearyl (meth)acrylate, phenyl (meth)acrylate, benzyl (meth)acrylate, cyclohexyl (meth)acrylate, 4-tert-butylcyclohexyl (meth)acrylate, isobornyl (meth)acrylate, tricyclodecanyl (meth)acrylate, dicyclopentadienyl (meth)acrylate, adamantyl (meth)acrylate, glycidyl (meth)acrylate, tetrahydrofurfuryl (meth)acrylate, 2-methoxyethyl (meth)acrylate, 2-ethoxyethyl (meth)acrylate, dimethylaminoethyl (meth)acrylate, diethylaminoethyl (meth)acrylate, trifluoroethyl (meth)acrylate, tetrafluoropropyl (meth)acrylate, pentafluoropropyl (meth)acrylate, octafluoropentyl (meth)acrylate, pentadecafluorooctyl (meth)acrylate, heptadecafluorodecyl (meth)acrylate, N,N-dimethyl(meth)acrylamide, (meth)acryloylmorpholine, (meth)acrylonitrile, and polyalkylene oxide group-containing (meth)acrylates such as polyethylene glycol (meth)acrylate, polypropylene glycol (meth)acrylate, polyethylene glycol-polypropylene glycol (meth)acrylate, polyethylene glycol-polybutylene glycol (meth)acrylate, polypropylene glycol-polybutylene glycol (meth)acrylate, methoxypolyethylene glycol (meth)acrylate, ethoxypolyethylene glycol (meth)acrylate, butoxypolyethylene glycol (meth)acrylate, octoxypolyethylene glycol (meth)acrylate, lauroxypolyethylene glycol (meth)acrylate, stearoxypolyethylene glycol (meth)acrylate, phenoxypolyethylene glycol (meth)acrylate, methoxypolypropylene glycol (meth)acrylate, and octoxypolyethylene glycol-polypropylene glycol (meth)acrylate. These monomers may be used alone or as a mixture of two or more types.

In the living anionic polymerization method, when the monomer used is a monomer having an active proton-containing group such as an anionic group, the active end of the living anionic polymerized polymer immediately reacts with the active proton-containing group and is thereby deactivated, so that no polymer is obtained. In living anionic polymerization, it is difficult to polymerize a monomer having an active proton-containing group without any treatment. It is therefore preferable to perform polymerization with the active proton-containing group protected and then perform deprotection to reconvert the protecting group into the active proton-containing group.

For this reason, it is preferable that a monomer containing a (meth)acrylate having a protecting group that can be reconverted into an anionic group by deprotection is used for the polymer block $A^3$. The use of such a monomer for the polymerization described above can prevent inhibition of the polymerization. The anionic group protected by the protecting group can be reconverted into the anionic group by deprotection after a block copolymer is obtained.

For example, when the anionic group is a carboxyl group, the carboxyl group is esterified. In a subsequent step, deprotection is performed through hydrolysis etc., and the esterified group can thereby be reconverted into the carboxyl group. In this case, the protecting group that can be converted into the carboxyl group is preferably a group having an ester bond, and examples of such a group include: primary alkoxycarbonyl groups such as a methoxycarbonyl group, an ethoxycarbonyl group, a n-propoxycarbonyl group, and a n-butoxycarbonyl group; secondary alkoxycarbonyl groups such as an isopropoxycarbonyl group and a sec-butoxycarbonyl group; tertiary alkoxycarbonyl groups such as a t-butoxycarbonyl group; phenylalkoxycarbonyl groups such as a benzyloxycarbonyl group; and alkoxyalkylcarbonyl groups such as an ethoxyethylcarbonyl group.

Examples of the monomer that can be used when the anionic group is a carboxyl group include: alkyl (meth)acrylates such as methyl (meth)acrylate, ethyl (meth)acrylate, n-propyl (meth)acrylate, isopropyl (meth)acrylate, n-butyl (meth)acrylate, sec-butyl (meth)acrylate, isobutyl (meth)acrylate, t-butyl (meth)acrylate, 2-ethylhexyl (meth)acrylate, decyl (meth)acrylate, undecyl (meth)acrylate, dodecyl (meth)acrylate (lauryl (meth)acrylate), tridecyl (meth)acrylate, pentadecyl (meth)acrylate, hexadecyl (meth)acrylate, heptadecyl (meth)acrylate, octadecyl (meth)acrylate (stearyl (meth)acrylate), nonadecyl (meth)acrylate, and icosanyl (meth)acrylate; phenylalkylene (meth)acrylates such as benzyl (meth)acrylate; and alkoxyalkyl (meth)acrylates such as ethoxyethyl (meth)acrylate. One type of these (meth)acrylates (c1) may be used, or a combination of two or more types may be used. Of these, (meth)acrylates (c1), t-butyl (meth)acrylate and benzyl (meth)acrylate are preferably used because their conversion reaction into a carboxyl group can be easily performed. In view of industrial availability, t-butyl (meth)acrylate is more preferred.

In general formula (1), B represents an aromatic group or an alkyl group having 1 to 10 carbon atoms. n represents an integer of 1 to 5.

In the living anionic polymerization method, direct polymerization of a (meth)acrylate monomer at the active end of a highly nucleophilic styrene-based polymer may not proceed because of nucleophilic attack to carbonyl carbon, so that the (meth)acrylate monomer is not polymerized. Therefore, when the (meth)acrylate monomer is polymerized to the $A^1$-$A^2$ described above, a reaction control agent is used to control nucleophilicity, and then the (meth) acrylate monomer is polymerized. B in general formula (1) is a group originating from the reaction control agent. Specific examples of the reaction control agent include diphenylethylene, α-methylstyrene, and p-methyl-α-methylstyrene.

(Living Anionic Polymerization Using Microreactor)

The living anionic polymerization method can be performed as a batch process used for conventional free radical polymerization by controlling the reaction conditions. A method in which a microreactor is used to perform polymerization continuously can also be used. The microreactor allows a polymerization initiator and a monomer to be mixed well, so that the reaction starts simultaneously in the microreactor. In addition, temperature is uniform within the microreactor, and a uniform polymerization rate is achieved, so that the polymer produced can have a narrow molecular weight distribution. In addition, it is easy to produce a block copolymer in which the components of the blocks are not mixed with each other because their growing ends are stable. Since the reaction temperature is well controlled, side reactions can be easily prevented.

A general method of living anionic polymerization using the microreactor will be described with reference to FIGURE showing a schematic diagram of the microreactor.

A first monomer and a polymerization initiator for initiating polymerization are introduced from tube reactors P1 and P2 (7 and 8 in FIGURE) into a T-shaped micromixer M1 (1 in FIGURE) including a flow passage in which a plurality of liquids can be mixed, and the first monomer is subjected to living anionic polymerization in the T-shaped micromixer M1 to thereby form a first polymer (step 1).

Next, the first polymer obtained is transferred to a T-shaped micromixer M2 (2 in FIGURE). In the micromixer M2, the growing end of the obtained polymer is trapped with a reaction control agent introduced from a tube reactor P3 (9 in FIGURE) to control the reaction (step 2).

In this case, the value of n in general formula (1) can be controlled by the type and amount used of the reaction control agent.

Next, the first polymer subjected to reaction control in the T-shaped micromixer M2 is transferred to a T-shaped micromixer M3 (3 in FIGURE), and a second monomer introduced from a tube reactor P4 and the first polymer subjected to reaction control are subjected to living anionic polymerization continuously in the mixer M3 (step 3).

Then the reaction is quenched with an active proton-containing compound such as methanol, and a block copolymer is thereby produced.

When the polymer (A) in the present invention represented by general formula (1) is produced using the microreactor described above, a monomer having an aromatic ring or a heterocycle is used as the first monomer, and an organic lithium initiator is used as the initiator to initiate the reaction, whereby a polymer block of the monomer having an aromatic ring or a heterocycle, i.e., $A^2$ described above, (an organic group, i.e., the organic lithium initiator residue $A^1$, is bonded to one end of the polymer block $A^2$) is obtained.

Next, the reaction control agent is used to control the reactivity of the growing end. Then a monomer containing a (meth)acrylate having a protecting group that can be reconverted into the anionic group is used as the second monomer and allowed to react to thereby obtain a polymer block.

Then a deprotection reaction such as hydrolysis is performed to reconvert the protecting groups into the anionic groups, and $A^3$ described above, i.e., a polymer block having the anionic groups, is thereby obtained.

A detailed description will be given of the method for reconverting an ester bond in the protecting group that can be reconverted into the anionic group into the anionic group by a deprotection reaction such as hydrolysis.

The hydrolysis reaction of the ester bond proceeds under acidic conditions and also under basic conditions, but the conditions vary slightly depending on the type of ester bond-containing group. For example, when the ester bond-containing group is a primary alkoxycarbonyl group such as a methoxycarbonyl group or a secondary alkoxycarbonyl group such as an isopropoxycarbonyl group, a carboxyl group can be obtained by hydrolysis under basic conditions. Examples of a basic compound used to form the basic conditions in this case include metal hydroxides such as sodium hydroxide and potassium hydroxide.

When the ester bond-containing group is a tertiary alkoxycarbonyl group such as a t-butoxycarbonyl group, a carboxyl group can be obtained by hydrolysis under acidic conditions. Examples of an acidic compound used to form the acidic conditions in this case include: mineral acids such as hydrochloric acid, sulfuric acid, and phosphoric acid; Bronsted acids such as trifluoroacetic acid; and Lewis acids such as trimethylsilyl triflate. The reaction conditions of hydrolysis of a t-butoxycarbonyl group under acidic conditions are disclosed in, for example, "Synthesis of Organic Compounds IV, The Fifth Series of Experimental Chemistry Vol. 16, Ed. by The Chemical Society of Japan."

Another example of the method for converting the t-butoxycarbonyl group into a carboxyl group is a method in which a cation exchange resin is used instead of the acid described above. Examples of the cation exchange resin include resins having, in their polymer side chains, acid groups such as carboxyl groups (—COOH) and sulfo groups (—SO$_3$H). Of these, a strongly acidic cation exchange resin having sulfo groups in its side chains is preferable because the rate of the reaction can be increased. Examples of the commercial product of the cation exchange resin that can be used in the present invention include strongly acidic cation exchange resin "Amberlite" manufactured by Organo Corporation. The amount of the cation exchange resin used is preferably within the range of 5 to 200 parts by mass and more preferably within the range of 10 to 100 parts by mass based on 100 parts by mass of the polymer represented by general formula (1) above because hydrolysis can be performed effectively.

When the ester bond-containing group is a phenylalkoxycarbonyl group such as a benzyloxycarbonyl group, the phenylalkoxycarbonyl group can be converted into a carboxyl group through a hydrogenation reduction reaction. In this case, the phenylalkoxycarbonyl group can be reconverted into a carboxyl group quantitatively by performing the reaction using hydrogen gas as a reducing agent in the presence of a palladium catalyst such as palladium acetate under the reaction condition of room temperature.

As described above, the reaction conditions for conversion into a carboxyl group vary depending on the type of ester bond-containing group. For example, a polymer obtained by copolymerization using t-butyl (meth)acrylate and n-butyl (meth)acrylate as raw materials of $A^3$ has t-butoxycarbonyl groups and n-butoxycarbonyl groups. Under the acidic conditions under which the t-butoxycarbonyl groups are hydrolyzed, the n-butoxycarbonyl groups are not hydrolyzed, so that only the t-butoxycarbonyl groups can be selectively hydrolyzed and converted into carboxyl groups through deprotection. Therefore, the acid value of the hydrophilic block ($A^3$) can be controlled by selecting, as raw material monomers of $A^3$, appropriate monomers each containing a (meth)acrylate having a protecting group that can be reconverted into an anionic group.

It is advantageous in terms of the stability of an aqueous pigment dispersion to be obtained that, in the polymer (A) represented by general formula (1) above, the polymer block ($A^2$) and the polymer block ($A^3$) are distinctly separated from each other. The molar ratio of the polymer block ($A^2$) to the polymer block ($A^3$), $A^2:A^3$, is preferably within the range of 100:10 to 100:500. If the ratio of $A^3$ to $A^2$ is less than 10/100, the dispersion stability of the pigment and the ejection stability during inkjet ejection tend to deteriorate. If the ratio of $A^3$ to $A^2$ exceeds 500/100, the hydrophilicity of the polymer becomes excessively high. In this case, when paper, for example, is used as a recording medium, the ink easily permeates the recording medium, and this causes deterioration in color development. In particular, the ratio $A^2:A^3$ is preferably 100:10 to 100:450.

In the polymer (A) represented by general formula (1) above, the number of units of the monomer having an aromatic ring or a heterocycle and forming the polymer block ($A^2$) is preferably within the range of 5 to 40, more preferably within the range of 6 to 30, and most preferably within the range of 7 to 25. The number of anionic groups included in the polymer block ($A^3$) is preferably within the range of 3 to 20, more preferably within the range of 4 to 17, and most preferably within the range of 5 to 15.

When the molar ratio of the polymer block ($A^2$) to the polymer block ($A^3$), $A^2:A^3$, is represented by the molar ratio of the number of moles of the aromatic rings or heterocycles included in the polymer block ($A^2$) to the number of moles of the anionic groups included in ($A^3$), this ratio is preferably 100:7.5 to 100:400.

The acid value of the polymer (A) represented by general formula (1) above is preferably 40 to 400 mg KOH/g, more preferably 40 to 300 mg KOH/g, and most preferably 40 to 190 mg KOH/g. If the acid value is less than 40 mg KOH/g, the dispersion stability of the pigment and the ejection stability during inkjet ejection may be insufficient. If the acid value exceeds 400 mg KOH/g, the hydrophilicity of the polymer increases, and the ink easily permeates a recording medium, so that color development deteriorates. When the acid value exceeds 190 mg KOH/g, the water resistance of the ink obtained is affected in some cases.

The acid value of the polymer in the present invention is an acid value obtained by the same acid value measurement method as that for the fine particles of the polymer (A).
(Neutralizer: Basic Compound)

In the ink for inkjet recording of the present invention, it is preferable that the anionic groups in the polymer (A) are neutralized.

Any well-known and commonly used basic compound can be used for the basic compound for neutralizing the anionic groups in the polymer (A). For example, inorganic basic materials such as alkali metal hydroxides, e.g., sodium hydroxide and potassium hydroxide, and organic basic compounds such as ammonia, triethylamine, and alkanolamines can be used.

In the present invention, it is not necessary that the degree of neutralization of the polymer (A) present in the aqueous pigment dispersion be 100% with respect to the acid value of the polymer. Specifically, the anionic groups are neutralized such that the degree of neutralization of the polymer (A) is preferably 20% to 200% and more preferably 80% to 150%.
(Self-Dispersible Pigment)

A self-dispersible pigment capable of dispersing in a water-soluble solvent and water without the use of the pigment dispersant may be used. For example, the self-dispersible pigment is produced by subjecting a pigment to physical treatment or chemical treatment to bond (graft) dispersibility-imparting groups or an active species having dispersibility-imparting groups to the surface of the pigment. Examples of the physical treatment and the chemical treatment include vacuum plasma treatment, oxidation treatment with hypohalous acid and/or a hypohalous acid salt, oxidation treatment with ozone, a wet oxidation method in which the surface of the pigment is oxidized using an oxidizer in water, and a method in which p-aminobenzoic acid is bonded to the surface of the pigment to bond carboxyl groups through phenyl groups.

Since it is unnecessary for a water-based ink containing the self-dispersible pigment to contain the pigment dispersant, almost no foaming due to the pigment dispersant occurs, and an ink excellent in ejection stability can be easily prepared. Since a significant increase in viscosity due to the pigment dispersant can be prevented, a larger amount of the pigment can be contained. This allows optical density to be increased sufficiently, or the ink can be handled easily.

A commercial self-dispersible pigment may be used. Examples of the commercial product include: Microjet CW-1 (tradename, manufactured by Orient Chemical Industries Co., Ltd.); and CAB-O-JET 200 and CAB-O-JET 300 (tradenames, manufactured by Cabot Corporation).
(Water)

The water used in the present invention is a dispersion medium for the pigment. The water used can be pure water such as ion exchanged water, ultrafiltrated water, reverse osmotic water, or distilled water or ultrapure water.

Water may be used alone, or a solvent mixture of water and a water-soluble solvent may be used. Examples of the water-soluble solvent include: ketones such as acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1,4-dioxane, and 1,2-dimethoxyethane; dimethylformamide; N-methylpyrrolidone; glycols such as ethylene glycol, diethylene glycol, triethylene glycol, tetraethylene glycol, propylene glycol, polyethylene glycol, and polypropylene glycol; diols such as butanediol, pentanediol, hexanediol, and similar diols; glycol esters such as propylene glycol laurate; glycol ethers such as diethylene glycol monoethyl ether, diethylene glycol monobutyl ether, diethylene glycol monohexyl ether, propylene glycol ether, dipropylene glycol ether, and Cellosolves including triethylene glycol ether; alcohols such as methanol, ethanol, isopropyl alcohol, 1-propanol, 2-propanol, 1-butanol, 2-butanol, butyl alcohol, pentyl alcohol, and similar alcohols; sulfolane; lactones such as γ-butyrolactone; lactams such as N-(2-hydroxyethyl)pyrrolidone; glycerin and derivatives thereof; and other various solvents known as water-soluble solvents. One or a mixture of two or more of these water-soluble organic solvents may be used.

Preferably, the water-soluble organic solvent used in this case is a high-boiling point water-soluble organic solvent because it is unnecessary to perform solvent removal etc. in a subsequent step. Examples of the high-boiling point water-soluble organic solvent include: glycols such as ethylene glycol, diethylene glycol, triethylene glycol, tetraethylene glycol, propylene glycol, polyethylene glycol, and polypropylene glycol; diols such as butanediol, pentanediol, hexanediol, and similar diols; glycol esters such as propylene glycol laurate; glycol ethers such as diethylene glycol monoethyl ether, diethylene glycol monobutyl ether, diethylene glycol monohexyl ether, propylene glycol ether, dipropylene glycol ether, and Cellosolves including triethylene glycol ether; sulfolane; lactones such as γ-butyrolactone; lactams such as N-(2-hydroxyethyl)pyrrolidone; glycerin and derivatives thereof; and other various solvents known as water-soluble solvents. One or a mixture of two or more of these water-soluble organic solvents may be used.

(Binder Resin)

No particular limitation is imposed on the binder resin. For example, one or a combination of two or more of polyvinyl alcohol, gelatin, polyethylene oxide, polyvinylpyrrolidone, acrylic resins, urethane resins, dextran, dextrins, carrageenans (κ, τ, λ, etc.), agar, pullulan, water-soluble polyvinyl butyral, hydroxyethyl cellulose, carboxymethyl cellulose, etc. may be used. Of these, acrylic resins are preferred, and an acrylic resin prepared by copolymerization with a polymerizable monomer having an amido group is preferred because good re-dispersibility can be obtained. The acrylic resin prepared by copolymerization with the polymerizable monomer having an amido group may be used in combination with another resin.

(Acrylic Resin Prepared by Copolymerization with Polymerizable Monomer Having Amido Group)

Examples of the acrylic monomer having an amido group include (meth)acrylamide, N-methyl(meth)acrylamide, N-ethyl(meth)acrylamide, N-propyl(meth)acrylamide, N-methylol(meth)acrylamide, N-isopropyl(meth)acrylamide, N-butyl(meth)acrylamide, N,N-dimethyl(meth)acrylamide, N,N-diethyl(meth)acrylamide, N,N-dipropyl(meth)acrylamide, N,N-dimethylaminopropyl(meth)acrylamide, diacetone(meth)acrylamide, and hydroxyethyl(meth)acrylamide.

The acrylic monomer having an amido group has the effect of improving the re-dispersibility of the water-based ink for inkjet recording of the present invention. In addition, the acrylic resin has a good balance between hydrophilicity and hydrophobicity and is stable in a water-soluble solvent and/or water.

If the amount of the acrylic monomer having an amido group in the acrylic resin is excessively large, the balance between hydrophilicity and hydrophobicity may deteriorate, and a cross-linked structure may be formed, so that the re-dispersibility may deteriorate. It is therefore preferable to use the acrylic monomer having an amido group in an amount of less than 5% by mass based on the total mass of monomers used for copolymerization. Specifically, the amount used of the acrylic monomer having an amido group is preferably 0.5% by mass or more and less than 5% by mass, more preferably 0.5 to 4% by mass, and most preferably 1.5 to 3% by mass based on the total mass of the monomers used as the raw materials for copolymerization.

No particular limitation is imposed on the other acrylic monomer used as a raw material of the acrylic resin (B), and a known polymerizable monomer can be used. Examples of the other acrylic monomer include: (meth)acrylic acid and alkali metal salts thereof; (meth)acrylate-based monomers such as methyl (meth)acrylate, ethyl (meth)acrylate, butyl (meth)acrylate, 2-ethylhexyl (meth)acrylate, benzyl (meth)acrylate, and cyclohexyl (meth)acrylate; acrylic monomers having amido groups such as acrylamide and N,N-dimethyl (meth)acrylamide; and acrylic monomers such as (meth) acrylonitrile, 2-dimethylaminoethyl (meth)acrylate, and glycidyl (meth)acrylate.

A monomer other than the acrylic monomers may be any monomer having an ethylenically unsaturated group that can undergo a polymerization reaction with the acrylic monomers, and examples of such a monomer include: aromatic vinyl compounds such as styrene, α-methylstyrene, p-tert-butylstyrene, vinylnaphthalene, and vinylanthracene; vinylsulfonic acid compounds such as vinylsulfonic acid and styrene sulfonic acid; vinylpyridine compounds such as 2-vinylpyridine, 4-vinylpyridine, and naphthylvinylpyridine; vinyltriethoxysilane; vinyltrimethoxysilane; p-styryltrimethoxysilane; 3-methacryloxypropylmethyldimethoxysilane; 3-methacryloxypropyltrimethoxysilane; 3-methacryloxypropylmethyldiethoxysilane; 3-methacryloxypropyltriethoxysilane; and 3-acryloxypropyltrimethoxysilane.

The other acrylic monomer is particularly preferably a monomer having an aromatic group such as styrene or benzyl (meth)acrylate in terms of compatibility with the pigment.

In terms of the adhesion to non-water absorptive plastic and metal or to highly hydrophobic coated and art paper, the acrylic resin (B) may contain a component which is insoluble in tetrahydrofuran (THF) used as an eluent for molecular weight measurement by gel permeation chromatography and therefore whose molecular weight is not easily measured.

The component insoluble in THF used as the eluent for molecular weight measurement of the acrylic resin by gel permeation chromatography can be considered to have a number average molecular weight of at least 100,000 and a mass average molecular weight of at least 500,000.

The acrylic resin is dispersed in a water-soluble solvent and/or water and may take various dispersion forms. However, in the present invention, no particular limitation is imposed on the dispersion form. The dispersion used may be, for example, a dispersion obtained by stirring the acrylic resin, an emulsifier, and water to disperse the acrylic resin in water or a dispersion obtained by subjecting the acrylic monomer to emulsion polymerization in an aqueous medium in the presence of an emulsifier.

No particular limitation is imposed on the particle diameter of the acrylic resin. In terms of the ejectability from an inkjet head, it is preferable that the acrylic resin has a small particle diameter. For example, it is preferable that the acrylic resin has an average particle diameter within the range of 10 to 200 nm as measured using "Microtrac particle size distribution analyzer "UPA-EX150" manufactured by NIKKISO Co., Ltd."

To obtain good gloss after printing and good resin coating properties, the amount of the binder, i.e., the solid resin content, is preferably 3 to 15% by mass, more preferably 5 to 12% by mass, and most preferably 7 to 10% by mass based on the total mass of the water-based ink for inkjet recording. It is not appropriate that the amount of the binder is less than 3% by mass because sufficient gloss and sufficient resin coating properties are not obtained. It is not appropriate that the amount of the binder is more than 12% by mass because nozzles of an inkjet printer may clog due to drying of the ink in the vicinity of the nozzles.

(Method for Producing Water-Based Ink for Inkjet Recording)

In the present invention, no particular limitation is imposed on the method for producing the water-based ink for inkjet recording, and a known method can be used.

For example, one method that can be used includes: mixing the pigment, the pigment dispersant, water, the binder resin, and, if necessary, various additives under stirring; dispersing and milling them using any of various dispersing devices and ink mills such as a bead mill, an ultrasonic homogenizer, a high-pressure homogenizer, a paint shaker, a ball mill, a roll mill, a sand mill, a sand grinder, a DYNO-MILL, a Dispermat, an SC-MILL, and a Nanomizer; adding and mixing the rest of the materials; and adjusting the viscosity appropriately.

The water-based ink can also be prepared by: adding a water-soluble solvent and/or water, the binder resin, and, if necessary, various additives to a self-dispersible pigment or a high-concentration dispersion (mill base) prepared in advance by using any of the above-described dispersing devices; mixing and stirring the resulting mixture; and diluting the mixture to the desired viscosity.

In particular, it is preferable to use a high-concentration dispersion prepared by dispersing the pigment with the polymer (A).

(Additional Additives)

The water-based ink for inkjet recording of the present invention can also be produced by adding a water-soluble solvent and/or water, the binder resin, etc. and, if necessary, adding a humectant (drying inhibitor), a penetrant, and other additives according to the desired physical properties.

After the preparation of the ink, a centrifugal step or a filtration step may be additionally performed.

(Humectant)

The humectant is added for the purpose of preventing drying of the ink. The humectant added for the purpose of preventing drying is contained in the ink in an amount of preferably 3 to 50% by mass.

No particular limitation is imposed on the humectant used in the present invention. It is preferable that the humectant is miscible with water and provides the effect of preventing clogging of a head of an inkjet printer. Examples of the humectant include ethylene glycol, diethylene glycol, triethylene glycol, polyethylene glycol having a molecular weight of 2,000 or less, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, meso-erythritol, and pentaerythritol. In particular, when 1,3-butyl glycol is contained, excellent effects on ink drying properties and ejectability are obtained while safety is achieved.

(Penetrant)

The penetrant is added for the purpose of improving the penetrability into a recording medium and controlling the diameter of dots on the recording medium.

Examples of the penetrant include: lower alcohols such as ethanol and isopropyl alcohol; ethylene oxide adducts of alkyl alcohols such as ethylene glycol hexyl ether and diethylene glycol butyl ether; and propylene oxide adducts of alkyl alcohols such as propylene glycol propyl ether. The amount of the penetrant contained in the ink is preferably 0.01 to 10% by mass.

(Surfactant)

The surfactant is added to control ink properties such as surface tension. No particular limitation is imposed on the surfactant that can be added for this purpose. Examples of the surfactant include anionic surfactants, nonionic surfactants, cationic surfactants, and amphoteric surfactants. Of these, anionic surfactants and nonionic surfactants are preferred.

Examples of the anionic surfactants include alkylbenzenesulfonates, alkylphenylsulfonates, alkylnaphthalenesulfonates, higher fatty acid salts, sulfates of higher fatty acid esters, sulfonates of higher fatty acid esters, sulfates and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates. Specific examples of the anionic surfactants include dodecylbenzenesulfonate, isopropylnaphthalenesulfonate, monobutylphenylphenolmonosulfonate, monobutylbiphenylsulfonate, and dibutylphenylphenoldisulfonate.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkyl amines, polyoxyethylene fatty acid amides, fatty acid alkylolamides, alkyl alkanolamides, acetylene glycol, oxyethylene adducts of acetylene glycol, and polyethylene glycol-polypropylene glycol block copolymers. Of these, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, and polyethylene glycol-polypropylene glycol block copolymers are preferred. In particular, acetylene glycol and oxyethylene adducts of acetylene glycol are more preferred because they can reduce the contact angle of an ink droplet on a substrate and therefore a good printed object is obtained.

Other surfactant may be used such as: silicone-based surfactants such as polysiloxane oxyethylene adducts; fluorine-based surfactants such as perfluoroalkyl carboxylates, perfluoroalkyl sulfonates, and oxyethylene perfluoroalkyl ethers; and bio-surfactants such as spiculisporic acid, rhamnolipid, and lysolecithin.

These surfactants may be used alone or as a mixture of two or more types. In consideration of the dissolution stability of the surfactant etc., the HLB of the surfactant is preferably within the range of 7 to 20. When the surfactant is added, the amount of the surfactant added is preferably within the range of 0.001 to 2% by mass, more preferably 0.001 to 1.5% by mass, and still more preferably 0.01 to 1% by mass based on the total mass of the ink. If the amount of the surfactant added is less than 0.001% by mass, the effects of the addition of the surfactant tend not to be obtained. If the amount of the surfactant added is more than 2% by mass, problems such as image blurring are likely to occur.

If necessary, a preservative, a viscosity modifier, a pH modifier, a chelating agent, a plasticizer, an antioxidant, an ultraviolet absorber, etc. may be added.

The amount of the pigment in the ink for inkjet recording is preferably 1 to 20% by mass, in order to obtain a sufficient image density and to ensure the dispersion stability of the pigment in the ink.

(Recording Medium)

No particular limitation is imposed on the recording medium for the water-based ink for inkjet recording. The recording medium can be an absorptive recording medium such as copying paper generally used in copiers (PPC paper), a recording medium having an ink absorbing layer, a non-absorptive recording medium having no ink absorbency, a low-absorptive recording medium having low ink absorbency, etc. One feature of the water-based ink for inkjet recording of the present invention is that good color development is achieved particularly when recording is performed on a recording medium having an ink absorbing layer, a non-water absorptive recording medium, and a low-absorptive recording medium.

Examples of the absorptive recording medium include plain paper, fabric, corrugated cardboards, and wood. Examples of the recording medium having an absorbing layer include inkjet paper. Specific examples of the inkjet paper include PICTORICOPRO Photopaper manufactured by Pictorico.

Examples of the non-water absorptive recording medium having no ink absorbency include products used as food packaging materials, and well-known plastic films can be used. Specific examples include: polyester films such as polyethylene terephthalate films and polyethylene naphthalate films; polyolefin films such as polyethylene films and polypropylene films; polyamide-based films such as nylon films; polystyrene films; polyvinyl alcohol films; polyvinyl chloride films; polycarbonate films; polyacrylonitrile films; and polylactic acid films. In particular, polyester films, polyolefin films, and polyamide-based films are preferred, and polyethylene terephthalate, polypropylene, and nylon are more preferred. The above films may be coated with, for example, polyvinylidene chloride in order to impart barrier properties. A film on which a vapor deposition layer of a metal such as aluminum or a metal oxide such as silica or alumina is deposited may also be used as needed.

The above plastic films may be unstretched films or may be uniaxially or biaxially stretched films. The surface of each film may be untreated. However, it is preferable that the film is subjected to treatment such as corona discharge treatment, ozone treatment, low-temperature plasma treatment, flame treatment, glow discharge treatment, etc. in order to improve adhesion.

The thickness of the plastic film is appropriately changed according to its intended application. For example, when the film is used for a soft packaging application, the thickness of the film is preferably 10 μm to 100 μm so that the film can have flexibility, durability, and curling resistance. The thickness is more preferably 10 μm to 30 μm. Specific examples of such a film include PYLEN (registered trademark) available from TOYOBO Co., Ltd.

Art paper such as printing paper, coated paper, light coated paper, lightweight coated paper, etc. can be used for the low-absorptive recording medium having low-ink absorbency. Such a low-absorptive recording medium is prepared by applying a coating material to the surface of high-quality or acid-free paper that is formed mainly of cellulose and is generally not surface-treated to thereby form a coating layer. Examples of the low-absorptive recording medium include: lightweight coated paper such as "OK EVERLIGHT COAT" manufactured by Oji Paper Co., Ltd. and "AURORA S" manufactured by Nippon Paper Industries Co., Ltd.; light coated paper (A3) such as "OK Coat L" manufactured by Oji Paper Co., Ltd. and "AURORA L" manufactured by Nippon Paper Industries Co., Ltd.; coated paper (A2, B2) such as "OK Top Coat+" manufactured by Oji Paper Co., Ltd. and "AURORA Coat" manufactured by Nippon Paper Industries Co., Ltd.; and art paper (A1) such as "OK KINFUJI+" manufactured by Oji Paper Co., Ltd. and "Tokubishi Art" manufactured by Mitsubishi Paper Mills Limited.

EXAMPLES

The present invention will next be described in more detail by way of Examples. However, the present invention is not limited to the following Examples so long as the gist of the invention is observed. In the following Examples, "g" and "%" are based on mass, unless otherwise specified.

(Method for Preparing Polymer (A))

Synthesis Example 1

Butyllithium (BuLi) used as the polymerization initiator and styrene (St) used as the first monomer were introduced from the tube reactors P1 and P2 in FIGURE into the T-shaped micromixer M1 in FIGURE and subjected to living anionic polymerization to form a polymer.

Next, the polymer obtained was transferred to the T-shaped micromixer M2 in FIGURE through a tube reactor R1 in FIGURE, and the growing end of the polymer was trapped with a reaction control agent (α-methylstyrene (α-MeSt)) introduced from the tube reactor P3 in FIGURE.

Next, tert-butyl methacrylate (t-BMA) used as the second monomer was introduced into the T-shaped micromixer M3 from the tube reactor P4 in FIGURE. The second monomer and the polymer transferred through a tube reactor R2 in FIGURE were subjected to a continuous living anionic polymerization reaction. Then the reaction was quenched with methanol to thereby produce a block copolymer (PA-1).

In this process, the entire microreactor was immersed in a thermostatic bath to set the reaction temperature to 24° C. Each of the monomers and the reaction control agent introduced into the microreactor was dissolved in tetrahydrofuran (THF). The BuLi used was a commercial 2.6M hexane solution, and this solution was diluted with hexane. The molar ratio of the block copolymer (PA-1) was controlled by the concentrations and introduction rates of these diluted solutions. The molar ratio is shown in Table 1.

The block copolymer (PA-1) obtained was hydrolyzed by treating it with a cation exchange resin. The reaction solution was subjected to evaporation under reduced pressure, and the solids obtained were pulverized to obtain a powder of polymer (P-1).

(Method for Preparing Random Polymer)

Synthesis Example 2

A reaction vessel equipped with a stirrer, a dropping unit, and a reflux unit was charged with 100 parts of methyl ethyl ketone, and the reaction vessel was purged with nitrogen under stirring. While the nitrogen atmosphere in the reaction vessel was maintained, the reaction vessel was heated to allow the methyl ethyl ketone to reflux, and then a solution mixture of 74 parts of styrene, 11 parts of acrylic acid, 15 parts of methacrylic acid, and 8 parts of a polymerization initiator ("V-75" manufactured by Wako Pure Chemical Industries, Ltd.) was added dropwise from the dropping unit over 2 hours. The temperature of the reaction system was held at 80° C. at some point during the dropwise addition.

After completion of the dropwise addition, the reaction was continued at 80° C. for 25 hours. During the reaction, the consumption of the raw materials was checked, and the polymerization initiator was added as needed. After completion of the reaction, methyl ethyl ketone was removed by evaporation under reduced presser, and the solids obtained were pulverized to thereby obtain a powder of polymer (PR-1).

The number average molecular weight of the polymer (PR-1) was 5,255, its weight average molecular weight was 9,000, and its acid value was 185 mg KOH/g.

(Methods for Measuring Physical Properties of Polymers)

The physical properties of the polymers (P-1) and (PR-1) were measured as follows.

(Method for Measuring Number Average Molecular Weight (Mn) and Weight Average Molecular Weight (Mw))

The measurement was performed by gel permeation chromatography (GPC) under the following conditions.

Measurement device: High performance GPC ("HLC-8220GPC" manufactured by TOSOH Corporation)

Columns: The following columns manufactured by TOSOH Corporation and connected in series were used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (refractive index detector)
Column temperature: 40° C.
Eluent: tetrahydrofuran (THF)
Flow rate: 1.0 mL/min
Injection amount: 100 µL (THF solution with a sample concentration of 0.4% by mass)

Standard samples: The following polystyrene standards were used to produce a calibration curve.
(Polystyrene Standards)
"TSKgel standard polystyrene A-500" manufactured by TOSOH Corporation
"TSKgel standard polystyrene A-1000" manufactured by TOSOH Corporation
"TSKgel standard polystyrene A-2500" manufactured by TOSOH Corporation
"TSKgel standard polystyrene A-5000" manufactured by TOSOH Corporation
"TSKgel standard polystyrene F-1" manufactured by TOSOH Corporation
"TSKgel standard polystyrene F-2" manufactured by TOSOH Corporation
"TSKgel standard polystyrene F-4" manufactured by TOSOH Corporation
"TSKgel standard polystyrene F-10" manufactured by TOSOH Corporation
"TSKgel standard polystyrene F-20" manufactured by TOSOH Corporation
"TSKgel standard polystyrene F-40" manufactured by TOSOH Corporation
"TSKgel standard polystyrene F-80" manufactured by TOSOH Corporation
"TSKgel standard polystyrene F-128" manufactured by TOSOH Corporation
"TSKgel standard polystyrene F-288" manufactured by TOSOH Corporation
"TSKgel standard polystyrene F-550" manufactured by TOSOH Corporation (Method for Measuring Acid Value)

The measurement was performed according to JIS test method K 0070-1992. Specifically, 0.5 g of a sample was dissolved in a THF solvent, and titration with a 0.1M alcohol solution of potassium hydroxide was performed using phenolphthalein as an indicator to determine the acid value.

(Method for Measuring Solubility in Water)

Sieves with mesh sizes of 250 µm and 90 µm were used to screen a polymer such that its particle diameter fell within the range of 250 µm to 90 µm. 0.5 g of the resulting polymer was sealed in a bag formed from a 400-mesh wire net, immersed in 50 mL of water, and left under mild stirring at a temperature of 25° C. for 24 hours. After immersion for 24 hours, the 400-mesh wire net with the polymer sealed therein was dried in a dryer set at 110° C. for 2 hours to dry the polymer. The change in weight of the 400-mesh wire net with the polymer sealed therein before and after the immersion in water was measured, and the solubility was computed using the following formula.

Solubility (g/100 mL)=(polymer-sealed 400-mesh wire net before immersion (g)−polymer-sealed 400-mesh wire net after immersion (g))×2    [Formula 3]

(Method for Judging Formation of Fine Particles in Water and Method for Measuring Average Particle Diameter (nm))

(1) The acid value of a polymer was determined according to the above-described method for measuring the acid value.

(2) 1 g of the polymer was added to 50 mL of water, and a 0.1 mol/L aqueous potassium hydroxide solution was added in an amount sufficient to completely neutralize the polymer having the acid value obtained in (1) above to thereby completely neutralize the polymer.

(3) The completely neutralized solution was subjected to ultrasonic waves at a temperature of 25° C. for 2 hours using an ultrasonic cleaner (ultrasonic cleaner US-102, SND Co., Ltd., 38 kHz, self-excited oscillation) to disperse the polymer and was then left to stand at room temperature for 24 hours.

After the solution was left to stand for 24 hours, a sample solution was sampled at a depth of 2 cm from the surface of the solution. Then a dynamic light scattering particle size measurement device ("Microtrac particle size distribution analyzer UPA-ST150" manufactured by NIKKISO Co., Ltd.) was used to determine whether or not information about light scattering due to the formation of fine particles was obtained, whereby the presence of fine particles was checked.

At the same time, the average particle diameter was measured.

(Method for Measuring Surface Tension)

The same sample solution as that obtained in the method for judging the formation of fine particles in water was used, and a value measured using a Wilhelmy surface tension meter was used as the surface tension.

The raw materials, reaction conditions, and physical properties of each of the polymers obtained in the above Synthesis Examples are shown in Tables 1 and 2.

TABLE 1

|  |  | Synthesis Example 1 | Synthesis Example 2 |
|---|---|---|---|
| Resin name |  | P-1 | P-2 |
| Reaction temperature |  | 24° C. | 24° C. |
| Initiator | Type | BuLi | BuLi |
|  | Molar ratio | 1.0 | 1.0 |
| First monomer | Type | St | St |
|  | Molar ratio | 12.0 | 9.0 |
| Reaction control agent | Type | α-MeSt | DPE |
|  | Molar ratio | 2.0 | 1.0 |
| Second monomer | Type | tBMA | tBMA |
|  | Molar ratio | 8.1 | 13.0 |
| Molar ratio of first block to second block | $A^2:A^3 =$ | 100:76 | 100:144 |
| Molecular weight (number average molecular weight) |  | 2471 | 2396 |

TABLE 1-continued

|  | Synthesis Example 1 | Synthesis Example 2 |
|---|---|---|
| Acid value  mg KOH/g | 148 | 193 |
| Solubility in water (g/100 mL) | 0.0056 | 0.027 |
| Presence of fine particles when degree of neutralization is 100%/average particle diameter (nm) | Yes/48 | Yes/13 |
| Surface tension (dyn/cm) | 67.7 | 37.5 |

TABLE 2

|  | PR-1 |
|---|---|
| Molecular weight (number average molecular weight) | 5255 |
| Acid value  mg KOH/g | 185 |
| Solubility in water (g/100 mL) | 0.031 |
| Presence of fine particles when degree of neutralization is 100%/average particle diameter (nm) | No |
| Surface tension (dyn/cm) | 45.0 |
| Water contact angle (°) | 49.6 |

In Tables 1 and 2,
BuLi stands for normal butyllithium,
St stands for styrene,
DPE stands for 1,1-diphenylethylene,
αMeSt stands for α methylstyrene,
tBMA stands for tert-butyl methacrylate, and
nBMA stands for n-butyl methacrylate.

(Production Examples: Method for Producing Aqueous Pigment Dispersions)

Aqueous pigment dispersions were obtained using the following methods in Production Examples. The amounts of raw materials used are shown in Tables below.

Production Example 1: Method for Producing Aqueous Pigment Dispersion (C-1)

Step 1 was performed. Specifically, a 1.0 L intensive mixer (Nippon Eirich Co., Ltd.) was charged with 150 parts of a phthalocyanine-based pigment FASTOGEN Blue Pigment (C.I. Pigment 15:3, manufactured by DIC Corporation) used as the pigment, 45 parts of the polymer (P-1) used as the polymer (A), 150 parts of triethylene glycol used as a water-soluble solvent, and 20 parts of a 34% aqueous potassium hydroxide solution, and then the mixture was kneaded at a rotor peripheral speed of 2.94 m/s and a pan peripheral speed of 1 m/s for 25 minutes.

Next, step 2 was performed. Specifically, 450 parts of ion exchanged water was gradually added to the kneaded mixture in the container of the intensive mixer under continuous stirring, and then 185 parts of ion exchanged water was added and mixed. An aqueous pigment dispersion (C-1) with a pigment concentration of 15.0% was thereby obtained.

Production Examples 2, 3, and 5 to 9: Method for Producing Aqueous Pigment Dispersions Aqueous pigment dispersions in Production Examples 2, 3, and 5 to 9 were obtained in the same manner as in Production Example 1 except that the type of the pigment, the type of the polymer (A), the ratio of the dispersion mediums, etc. were changed.

Production Example 4: Method for Producing Aqueous Pigment Dispersion (C-2)

Step 1 was performed. Specifically, a 0.2 L atmospheric pressure kneader (manufactured by Advance Co., Ltd.) was charged with 120 parts of a phthalocyanine-based pigment FASTOGEN Blue Pigment (C.I. Pigment 15:3, manufactured by DIC Corporation) used as the pigment and 36 parts of the polymer (PR-1) used as the polymer (A), and the pigment and the polymer (A) were mixed at a jacket temperature of 80° C. (blade rotation speed: 40 rpm). Then 52 parts of diethylene glycol used as a water-soluble solvent and 20 parts of a 34% aqueous potassium hydroxide solution used as the basic compound were added, and the mixture was kneaded for 1 hour.

Next, step 2 was performed. Specifically, 360 parts of ion exchanged water was gradually added to the kneaded mixture in the container under continuous stirring, and then a solution mixture of 68 parts of diethylene glycol and 144 parts of ion exchanged water (the amount of ion exchanged water was adjusted such that the total amount of the ion exchanged water and 20 parts of the 34% aqueous potassium hydroxide solution added previously was 164 parts) was added and mixed. An aqueous pigment dispersion (C-2) with a pigment concentration of 15.0% was thereby obtained.

The compositions in Production Examples 1 to 9 are shown in Table 3.

TABLE 3

|  | Production Example 1 | Production Example 2 | Production Example 3 | Production Example 4 | Production Example 5 |
|---|---|---|---|---|---|
| Aqueous pigment dispersion name | C-1 | K-1 | K-2 | C-2 | C-3 |
| Type of pigment | PB15:3 | PB7 | PB7 | PB15:3 | PB15:3 |
| Amount of pigment (parts) | 150 | 150 | 150 | 120 | 120 |
| Type of polymer (A) | P-1 | P-1 | P-1 | PR-1 | P-2 |
| Amount of polymer (A) (parts) | 45 | 45 | 45 | 36 | 36 |
| Acid value of polymer (A) | 148 | 148 | 148 | 185 | 193 |
| Weight ratio of polymer (A)/pigment | 0.3 | 0.3 | 0.3 | 0.3 | 0.3 |
| Step 1 |  |  |  |  |  |
| Type of water-soluble solvent | TEG | TEG | TEG | DEG | DEG |
| Amount of water-soluble solvent (parts) | 150 | 135 | 225 | 52 | 52 |
| Amount of KOH (parts) | 20 | 20 | 20 | 20 | 20 |
| Step 2 |  |  |  |  |  |
| Dispersion medium: first addition (Figures are in parts) | Water = 450 | Water = 450 | Water = 450 | Water = 360 | Water = 360 |
| Dispersion mediums: second | TEG:water = | TEG:water = | TEG:water = | DEG:water = | DEG:water = |

TABLE 3-continued

|  | Production Example 1 | Production Example 2 | Production Example 3 | Production Example 4 | Production Example 5 |
|---|---|---|---|---|---|
| addition (Figures are in parts) | 0/185 | 0/140 | 0/110 | 68/144 | 68/144 |
| Volume average particle diameter (nm) of aqueous pigment dispersion | 110.5 | 69.4 | 74.3 | 106 | 112.1 |
| Number of coarse particles of 1.0 μm or more (×10$^6$/mL) | 28 | 6 | 7 | 90 | 8 |

TABLE 4

|  | Production Example 6 | Production Example 7 | Production Example 8 | Production Example 9 |
|---|---|---|---|---|
| Aqueous pigment dispersion name | C-4 | M-1 | Y-1 | Y-2 |
| Type of pigment | PB15:3 | PR122 | PY74 | PY74 |
| Amount of pigment (parts) | 150 | 150 | 150 | 150 |
| Type of polymer (A) | P-1 | P-1 | P-1 | P-1 |
| Amount of polymer (A) (parts) | 30 | 30 | 45 | 30 |
| Acid value of polymer (A) | 148 | 148 | 148 | 148 |
| Weight ratio of polymer (A)/pigment | 0.2 | 0.2 | 0.3 | 0.2 |
| Step 1 |  |  |  |  |
| Type of water-soluble solvent | TEG | TEG | TEG | TEG |
| Amount of water-soluble solvent (parts) | 150 | 150 | 150 | 150 |
| Amount of KOH (parts) | 20 | 20 | 20 | 20 |
| Step 2 |  |  |  |  |
| Dispersion medium: first addition (Figures are in parts) | Water = 450 | Water = 450 | Water = 450 | Water = 450 |
| Dispersion mediums: second addition (Figures are in parts) | TEG:water = 0/185 | TEG:water = 0/185 | TEG:water = 0/185 | TEG:water = 0/185 |
| Volume average particle diameter (nm) of aqueous pigment dispersion | 101.2 | 113.5 | 94.7 | 94.1 |
| Number of coarse particles of 1.0 μm or more (×10$^6$/ml) | 1 | 4 | 22 | 3 |

The abbreviations in the tables are as follows.
PB 15:3: Phthalocyanine-based pigment FASTOGEN Blue Pigment (C.I. Pigment 15:3 manufactured by DIC Corporation)
PB7: Pigment Black 7
PR122: Pigment Red 122
PY74: Pigment Yellow 74
KOH: 34% Aqueous potassium hydroxide solution
DEG: Diethylene glycol
TEG: Triethylene glycol
Water: Ion exchanged water (Method for Preparing Binder Resin)

Synthesis Example 3

A four-neck flask equipped with a stirrer, a thermometer, a cooling tube, and a nitrogen introduction tube was charged with 16 g of "Newcol 707SF" [an anionic emulsifier manufactured by Nippon Nyukazai Co., Ltd.], 6.5 g of "NOIGEN TDS-200D" [a nonionic emulsifier manufactured by DAI-ICHI KOGYO SEIYAKU Co., Ltd.], and 220 g of ion exchanged water. The temperature of the mixture was increased to 80° C. under nitrogen flow, and then an aqueous solution prepared by dissolving 0.8 g of ammonium persulfate in 16 g of deionized water was added. Then a mixture of 60 g of 2-ethylhexyl acrylate, 100 g of styrene, 27 g of methyl methacrylate, 3 g of acrylamide, and 6 g of methacrylic acid was added dropwise over 3 hours. After completion of the dropwise addition, the resulting mixture was allowed to react for 2 hours, cooled to 25° C., and neutralized with 1.5 g of 28 mass % ammonia water, and deionized water was added to adjust the amount of non-volatile components to 45% by mass, whereby an aqueous acrylic resin dispersion (X-1) having a glass transition temperature (Tg) of 35° C. and an average particle diameter of 50 nm was obtained. The final solid content of the acrylic resin dispersion (X-1) was 39%.

(Preparation of Water-Based Inks)

Reference Examples: Preparation of Water-Based Inks for Water Resistance Measurement To measure the water resistance of inkjet-printed objects, water-based inks for inkjet recording used for water resistance evaluation were produced using the aqueous pigment dispersions in Production Examples 1 and 5.

Each water-based ink for inkjet recording used for water resistance evaluation was prepared such that the final pigment concentration was 5% by mass.

Aqueous pigment dispersion: about 5 parts (pigment content)
Propylene glycol: 15 parts
1,3-butanediol: 10 parts
Surfynol 440: 0.50 parts
Pure water: Balance (the total amount is set to 100 parts)

One of the water-based inks for inkjet recording used for water resistance evaluation was spread over a 10 mm-wide cut paper sheet using a No. 4 bar coater.

The resultant paper sheet was immersed in 10 mL of pure water such that an area of 40 mm×10 mm was immersed. The paper sheet was left to stand for 10 minutes, and then the degree of color loss was evaluated based on absorbance.

The results showed that, in Reference Example 2 in which the polymer (A) used was P-2 having an acid value more than 190 mg KOH/g, the water resistance by this test method was poor.

TABLE 5

|  | Reference Example 1 | Reference Example 2 |
|---|---|---|
| Aqueous pigment dispersion name | C-1 | C-3 |
| Type of polymer (A) | P-1 | P-2 |
| Acid value of polymer (A) mg KOH/g | 148 | 193 |
| Water resistance (absorbance) | 0.001 or less | 0.409 |

(Preparation of Water-Based Inks)

Preparation Example 1: Method for Producing Water-Based Ink 21.79 g of the aqueous acrylic resin dispersion (X-1) obtained in Synthesis Example 3, 25.71 g of distilled water, 6.00 g of MB (3-methoxy-1-butanol manufactured by Daicel Corporation), 8.00 g of propylene glycol, 4.00 g of glycerin, 2.00 g of SC-P1000 (polyoxypropylene(14)polyglyceryl ether manufactured by Sakamoto Yakuhin kogyo Co., Ltd.), 0.95 g of triethylene glycol, 0.10 g of ACTICIDE MV4 (a preservative manufactured by Thor Japan), 0.20 g of triethanolamine, and 1.25 g of SURFYNOL DF110D (an acetylene dialcohol-based surfactant manufactured by Air Products and Chemicals, Inc.) were added to 30.00 g of the aqueous pigment dispersion (K-1) used as an aqueous pigment dispersion. The mixture was stirred, and a black water-based ink (J1) was thereby prepared.

Preparation Examples 2 to 12: Method for Producing Water-Based Inks

Water-based inks (J2) to (J12) were obtained in the same manner as in Preparation Example 1 except that compositions shown in Tables 6, 7, and 8 were used.

Comparative Preparation Examples 1 to 7: Method for Producing Water-Based Inks

Water-based inks (H1) to (H7) were obtained in the same manner as in the Preparation Examples except that compositions shown in Tables 9 and 10 were used.

TABLE 6

|  |  |  | Example 1 | Example 2 | Example 3 | Example 4 | Example 5 |
|---|---|---|---|---|---|---|---|
|  | Sample name |  | J1 | J2 | J3 | J4 | J5 |
| Urea compound |  | Urea |  |  |  |  | 5.00 |
|  |  | Ethyleneurea | 5.00 | 5.00 | 5.00 | 5.00 |  |
| Organic solvent | (1) | MB | 6.00 | 8.00 | 8.00 | 6.00 | 7.50 |
|  | (2) | PG | 8.00 | 8.00 | 8.00 | 8.00 | 7.50 |
|  | (3) | GLY | 4.00 | 4.00 | 4.00 | 4.00 |  |
|  |  | SC-P1000 | 2.00 | 2.00 |  | 2.00 | 7.00 |
|  |  | TEG | 0.95 | 0.50 | 0.95 | 0.95 | 0.50 |
|  |  | Sulfolane |  |  |  |  |  |
| Aqueous pigment dispersion | Polymer (A) | C-1 |  | 30.00 |  |  |  |
|  |  | C-3 |  |  |  |  |  |
|  |  | C-4 |  |  |  |  |  |
|  |  | K-1 | 30.00 |  | 30.00 | 30.00 |  |
|  |  | K-2 |  |  |  |  | 20.00 |
|  |  | M-1 |  |  |  |  |  |
|  |  | Y-1 |  |  |  |  |  |
|  |  | Y-2 |  |  |  |  |  |
|  | Random | C-2 |  |  |  |  |  |
| Additional additives | Surfactant | KL245 |  |  |  | 0.40 | 0.40 |
|  |  | DF110D | 1.25 | 1.25 | 1.25 |  |  |
|  | Binder resin | X-1 | 21.79 | 21.79 | 21.79 | 21.79 | 21.79 |
|  |  | ACTICIDE MV4 | 0.10 | 0.10 | 0.10 | 0.10 | 0.10 |
|  |  | Triethanolamine | 0.20 | 0.20 | 0.20 | 0.20 | 0.20 |
|  |  | Distilled water | 20.71 | 19.16 | 20.71 | 21.56 | 30.01 |
|  |  | Total | 100.00 | 100.00 | 100.00 | 100.00 | 100.00 |
|  | Total amount of organic solvents and urea compound in ink |  | 30.00 | 32.00 | 30.00 | 30.00 | 32.00 |

TABLE 7

|  |  |  | Example 6 | Example 7 | Example 8 |
|---|---|---|---|---|---|
| Sample name |  |  | J6 | J7 | J8 |
| Urea compound |  | Urea | 5.00 |  | 5.00 |
|  |  | Ethyleneurea |  | 5.00 |  |
| Organic solvent | (1) | MB | 7.50 | 6.00 | 8.00 |
|  | (2) | PG | 7.50 | 8.00 | 8.00 |
|  | (3) | GLY |  | 4.00 | 4.00 |
|  |  | SC-P1000 | 7.00 | 2.00 | 2.00 |
|  |  | TEG |  | 1.50 | 0.50 |
|  |  | Sulfolane | | | |
| Aqueous pigment dispersion | Polymer (A) | C-1 | 23.33 | | |
|  |  | C-3 | | | 30.00 |
|  |  | C-4 | | | |
|  |  | K-1 | | | |
|  |  | K-2 | | | |
|  |  | M-1 | | | |
|  |  | Y-1 | | | |
|  |  | Y-2 | | | |
|  | Random | C-2 | | 30.00 | |
| Additional additives | Surfactant | KL245 | 0.40 | | |
|  |  | DF110D | | 1.25 | 1.25 |
|  | Binder resin | X-1 | 21.79 | 21.79 | 21.79 |
|  | ACTICIDE MV4 | | 0.10 | 0.10 | 0.10 |
|  | Triethanolamine | | 0.20 | 0.20 | 0.20 |
| Distilled water | | | 25.68 | 21.16 | 19.16 |
| Total | | | 100.00 | 100.00 | 100.00 |
| Total amount of organic solvents and urea compound in ink | | | 32.00 | 30.00 | 32.00 |

TABLE 8

|  |  |  | Example 9 | Example 10 | Example 11 | Example 12 |
|---|---|---|---|---|---|---|
| Sample name |  |  | J9 | J10 | J11 | J12 |
| Urea compound |  | Urea | | | 4.00 | |
|  |  | Ethyleneurea | 5.00 | 5.00 | | 5.00 |
| Organic solvent | (1) | MB | 6.00 | 6.00 | 7.00 | 6.00 |
|  | (2) | PG | 8.00 | 8.00 | 7.00 | 8.00 |
|  | (3) | GLY | 7.00 | 7.00 | | 7.00 |
|  |  | SC-P1000 | 2.00 | | 3.00 | 2.00 |
|  |  | TEG | 0.79 | | | 0.92 |
|  |  | Sulfolane | | | 3.00 | |
| Aqueous pigment dispersion | Polymer (A) | C-1 | | | | |
|  |  | C-3 | | | | |
|  |  | C-4 | 33.83 | | | |
|  |  | K-1 | | | | |
|  |  | K-2 | | | | |
|  |  | M-1 | | 37.47 | | |
|  |  | Y-1 | | | 32.28 | |
|  |  | Y-2 | | | | 33.69 |
|  | Random | C-2 | | | | |
| Additional additives | Surfactant | KL245 | | | 0.40 | |
|  |  | DF110D | 1.25 | 1.25 | | 1.25 |
|  | Binder resin X-1 | | 17.67 | 17.67 | 21.79 | 17.67 |
|  | ACTICIDE MV4 | | 0.10 | 0.10 | 0.10 | 0.10 |
|  | Triethanolamine | | 0.20 | 0.20 | 0.20 | 0.20 |
| Distilled water | | | 18.16 | 17.31 | 21.23 | 18.17 |
| Total | | | 100.00 | 100.00 | 100.00 | 100.00 |
| Total amount of organic solvents and urea compound in ink | | | 33 | 31 | 26 | 33 |

TABLE 9

|  |  |  | Comparative Example 1 | Comparative Example 2 | Comparative Example 3 | Comparative Example 4 | Comparative Example 5 |
|---|---|---|---|---|---|---|---|
| Sample name |  |  | H1 | H2 | H3 | H4 | H5 |
| Urea compound |  | Urea | 3.00 | 3.00 | | 10.00 | |
|  |  | Ethyleneurea | | | | | |
| Organic solvent | (1) | MB | | 13.00 | 7.50 | 7.50 | 13.00 |
|  | (2) | PG | 13.00 | | 7.50 | 7.50 | 10.00 |
|  | (3) | GLY | | | 10.00 | | |
|  |  | SC-P1000 | 3.00 | 3.00 | | | |
|  |  | TEG | 3.90 | 3.90 | 0.00 | 0.00 | 0.00 |
|  |  | Sulfolane | | | | | |
| Aqueous pigment dispersion | Polymer (A) | C-1 | 34.00 | 34.00 | 34.00 | 34.00 | 34.00 |
|  |  | C-3 | | | | | |
|  |  | C-4 | | | | | |
|  |  | K-1 | | | | | |
|  |  | K-2 | | | | | |
|  |  | M-1 | | | | | |

TABLE 9-continued

|  |  |  | Comparative Example 1 | Comparative Example 2 | Comparative Example 3 | Comparative Example 4 | Comparative Example 5 |
|---|---|---|---|---|---|---|---|
|  |  | Y-1 |  |  |  |  |  |
|  |  | Y-2 |  |  |  |  |  |
|  | Random | C-2 |  |  |  |  |  |
| Additional additives | Surfactant | KL245 | 0.40 | 0.40 | 0.40 | 0.40 | 0.40 |
|  |  | DF110D |  |  |  |  |  |
|  | Binder resin | X-1 | 21.79 | 21.70 | 21.70 | 21.79 | 21.79 |
|  | ACTICIDE MV4 |  | 0.10 | 0.10 | 0.10 | 0.10 | 0.10 |
|  | Triethanolamine |  | 0.20 | 0.20 | 0.20 | 0.20 | 0.20 |
| Distilled water |  |  | 20.61 | 20.7 | 18.6 | 18.51 | 20.51 |
|  | Total |  | 100.00 | 100.00 | 100.00 | 100.00 | 100.00 |
| Total amount of organic solvents and urea compound in ink |  |  | 28.00 | 28.00 | 30.00 | 30.00 | 28.00 |

TABLE 10

|  |  |  | Comparative Example 6 | Comparative Example 7 |
|---|---|---|---|---|
| Sample name |  |  | H6 | H7 |
| Urea compound |  | Urea |  |  |
|  |  | Ethyleneurea |  |  |
| Organic solvent | (1) | MB | 13.00 |  |
|  | (2) | PG |  | 13.00 |
|  | (3) | GLY | 10.00 | 10.00 |
|  |  | SC-P1000 |  |  |
|  |  | TEG | 0.00 | 0.41 |
|  |  | Sulfolane |  |  |
| Aqueous pigment dispersion | Polymer (A) | C-1 | 34.00 |  |
|  |  | C-3 |  |  |
|  |  | C-4 |  |  |
|  |  | K-1 |  | 34.00 |
|  |  | K-2 |  |  |
|  |  | M-1 |  |  |
|  |  | Y-1 |  |  |
|  |  | Y-2 |  |  |
|  | Random | C-2 |  |  |
| Additional additives | Surfactant | KL245 | 0.40 | 0.40 |
|  |  | DF110D |  |  |
|  | Binder resin | X-1 | 21.79 | 21.79 |
|  | ACTICIDE MV4 |  | 0.10 | 0.10 |
|  | Triethanolamine |  | 0.20 | 0.20 |
| Distilled water |  |  | 20.51 | 20.10 |
| Total |  |  | 100.00 | 100.00 |
| Total amount of organic solvents and urea compound in ink |  |  | 28.00 | 28.00 |

In the tables, each blank field means the content is zero. The abbreviations in the tables are as follows.

MB: 3-Methoxy-1-butanol manufactured by Daicel Corporation

PG: Propylene glycol manufactured by Wako Pure Chemical Industries, Ltd.

GLY: Purified glycerin manufactured by Kao Corporation

SC-P1000: Polyoxypropylene(14)polyglyceryl ether manufactured by Sakamoto Yakuhin kogyo Co., Ltd.

TEG: Triethylene glycol manufactured by NIPPON SHOKUBAI Co., Ltd.

KL245: Silicone-based surfactant TEGOWET KL245 manufactured by EVONIK

DF110D: Acetylene dialcohol-based surfactant SURFYNOL DF110D manufactured by Air Products and Chemicals, Inc.

(1), (2), and (3) in the tables are as follows.

(1): Organic solvent (S1)

(2): Propylene glycol (3): Organic solvent (S3)

(Evaluation of Water-Based Inks)

The characteristics of the water-based inks (J1) to (J12) and (H1) to (H7) were evaluated as follow. The results are shown in Tables 11 to 15.

[Offset Resistance of Inks]

One of the water-based inks obtained in the Examples and the Comparative Examples was spread over an A2 coated paper sheet "OK Top Coat+" (manufactured by Oji Paper Co., Ltd.) applied to a copper plate using a #12 bar coater, and the resulting paper sheet was placed on a hot plate heated to 150° C. for 5 seconds to dry the ink. Immediately after this, the resulting paper sheet with the ink coating was transferred to another hot plate heated to 100° C., and a white coated paper sheet was placed on the paper sheet with the ink coating. A weight was placed on the white coated paper sheet such that a load of 100 g/cm$^2$ was applied and left to stand for 1 minute.

After the lapse of 1 minute, the weight was removed, and the white coated paper sheet was peeled off the paper sheet with the ink coating. Then the ratio of the coating remaining on the paper sheet was analyzed using image analysis software "ImageJ" and evaluated as follows.

A: The ratio of the coating remaining on the paper sheet was 80% or more.

C: The ratio of the coating remaining on the colored paper sheet was less than 80%.

[Re-Dispersibility of Ink Film]

One of the water-based inks obtained in the Examples and the Comparative Examples was applied to a glass slide to a thickness of 4 μm using a bar coater and dried in a dryer at 32° C. for one hour to produce a test plate. Then the test plate was immersed in 35 g of a test solution prepared by mixing 20 g of distilled water and 10 g of propylene glycol at room temperature for 5 minutes, and the glass slide was moved back and forth 10 times in the test solution to visually check whether or not the ink re-dissolved. The ink was evaluated as follows.

AA: The test solution was colored, and no color component was found on the removed glass slide. The film completely dissolved in the test solution.

A: The test solution was colored, and no color component was found on the glass slide. However, a very small amount of undissolved ink was found in the test solution.

B: The test solution was colored, but undissolved pieces were found on part of the glass slide or in part of the test solution.

C: A significant amount of undissolved ink was found on the glass slide or in the test solution, and the test solution was not colored.

[Quality of Printed Images]

One of the water-based inks (J1) to (J12) and (H1) to (H7) was charged into a cartridge of an inkjet printer PX-105 manufactured by Seiko Epson Corporation, and solid printing was performed on an A2 coated paper sheet "OK Top Coat+" manufactured by Oji Paper Co., Ltd. A 1 cm×1 cm square region in the printed sheet was observed under an optical microscope at a magnification of 50×, and evaluation was made as follows.

A: The number of white streaks in the field of view was less than 10.

B: The number of white streaks in the field of view was 10 or more.

C: The number of white streaks in the field of view was 10 or more, and a non-printed region is present.

TABLE 11

|  | Example 1 | Example 2 | Example 3 | Example 4 | Example 5 |
|---|---|---|---|---|---|
| Sample name | J1 | J2 | J3 | J4 | J5 |
| Offset resistance of ink | A | A | A | A | A |
| Re-dispersibility of ink film | AA | AA | AA | AA | AA |
| Quality of printed image | AA | AA | A | B | B |

TABLE 12

|  | Example 6 | Example 7 | Example 8 |
|---|---|---|---|
| Sample name | J6 | J7 | J8 |
| Offset resistance of ink | A | A | A |
| Re-dispersibility of ink film | AA | A | AA |
| Quality of printed image | B | B | B |

TABLE 13

|  | Example 9 | Example 10 | Example 11 | Example 12 |
|---|---|---|---|---|
| Sample name | J9 | J10 | J11 | J12 |
| Offset resistance of ink | A | A | A | A |
| Re-dispersibility of ink film | AA | AA | AA | AA |
| Quality of printed image | AA | A | B | AA |

TABLE 14

|  | Comparative Example 1 | Comparative Example 2 | Comparative Example 3 | Comparative Example 4 | Comparative Example 5 |
|---|---|---|---|---|---|
| Sample name | H1 | H2 | H3 | H4 | H5 |
| Offset resistance of ink | C | A | A | A | C |
| Re-dispersibility of ink film | A | C | B | C | A |
| Quality of printed image | B | C | B | C | B |

TABLE 15

|  | Comparative Example 6 | Comparative Example 7 |
|---|---|---|
| Sample name | H6 | H7 |
| Offset resistance of ink | A | A |
| Re-dispersibility of ink film | C | C |
| Quality of printed image | C | C |

As can be seen from the above results, in the water-based inks in Examples 1 to 12, the offset resistance of the inks and the re-dispersibility of the ink films were good. As can be seen, in Examples 1 to 6 and 8 to 12, the polymer (A) was used as the dispersion resin, and the re-dispersibility of the ink films was further improved. As can be seen, in Examples 1 to 3, 9, 10, and 12, the acetylene-based surfactant was used, and the quality of the printed images was further improved.

However, in the compositions of the water-based inks in Comparative Examples 1 to 7, any of the organic solvents (S1) to (3) was not contained. Therefore, the offset resistance of the inks and the re-dispersibility of the ink films were not achieved simultaneously, and good printed image quality could not be obtained.

BRIEF DESCRIPTION OF DRAWINGS

FIGURE is a schematic diagram of the microreactor used in the present invention.

REFERENCE SIGNS LIST

1: T-shaped micromixer M1
2: T-shaped micromixer M2
3: T-shaped micromixer M3
4: tube reactor R1
5: tube reactor R2
6: tube reactor R3
7: tube reactor P1 for precooling
8: tube reactor P2 for precooling
9: tube reactor P3 for precooling
10: tube reactor P4 for precooling

The invention claimed is:

1. A water-based ink for inkjet recording, comprising a pigment, water, organic solvents, at least one compound selected from urea compounds, and a binder resin,
   wherein the organic solvents include at least:
   (1) a water-soluble organic solvent having a boiling point of from 100° C. to 200° C. inclusive and a vapor pressure at 20° C. of 0.5 hPa or more,
   (2) propylene glycol, and
   (3) glycerin, diglycerin, and/or a derivative thereof serving as an organic solvent, and
   (4) a polymer (A) serving as a pigment dispersant, the polymer (A) having an anionic group and having a solubility in water of 0.1 g/100 mL or less, a number average molecular weight within the range of 1,000 to 6,000, and an acid value within the range of 40 to 190 mg KOH/g.

2. The water-based ink for inkjet recording according to claim 1, wherein the polymer (A) is represented by general formula (1):

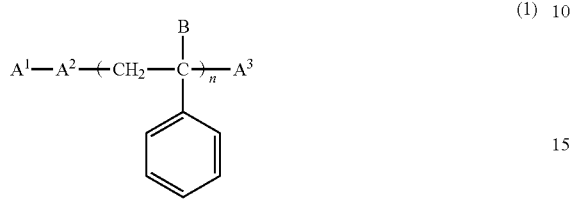

(1)

(wherein, in formula (1), $A^1$ represents an organic lithium initiator residue, $A^2$ represents a polymer block of a monomer having an aromatic ring or a heterocycle, $A^3$ is a polymer block containing an anionic group, n represents an integer of 1 to 5, and B represents an aromatic group or an alkyl group).

3. The water-based ink for inkjet recording according to claim 1, further comprising an acetylene-based surfactant.

4. The water-based ink for inkjet recording according to claim 1, wherein the water-soluble organic solvent having a boiling point of from 100° C. to 200° C. inclusive and a vapor pressure at 20° C. of 0.5 hPa or more is 3-methoxy-1-butanol or 3-methyl-3-methoxy-1-butanol.

* * * * *